Jan. 2, 1940.   J. J. FLANIGAN   2,185,188
DUPLICATING MACHINE
Filed April 26, 1938    9 Sheets-Sheet 3
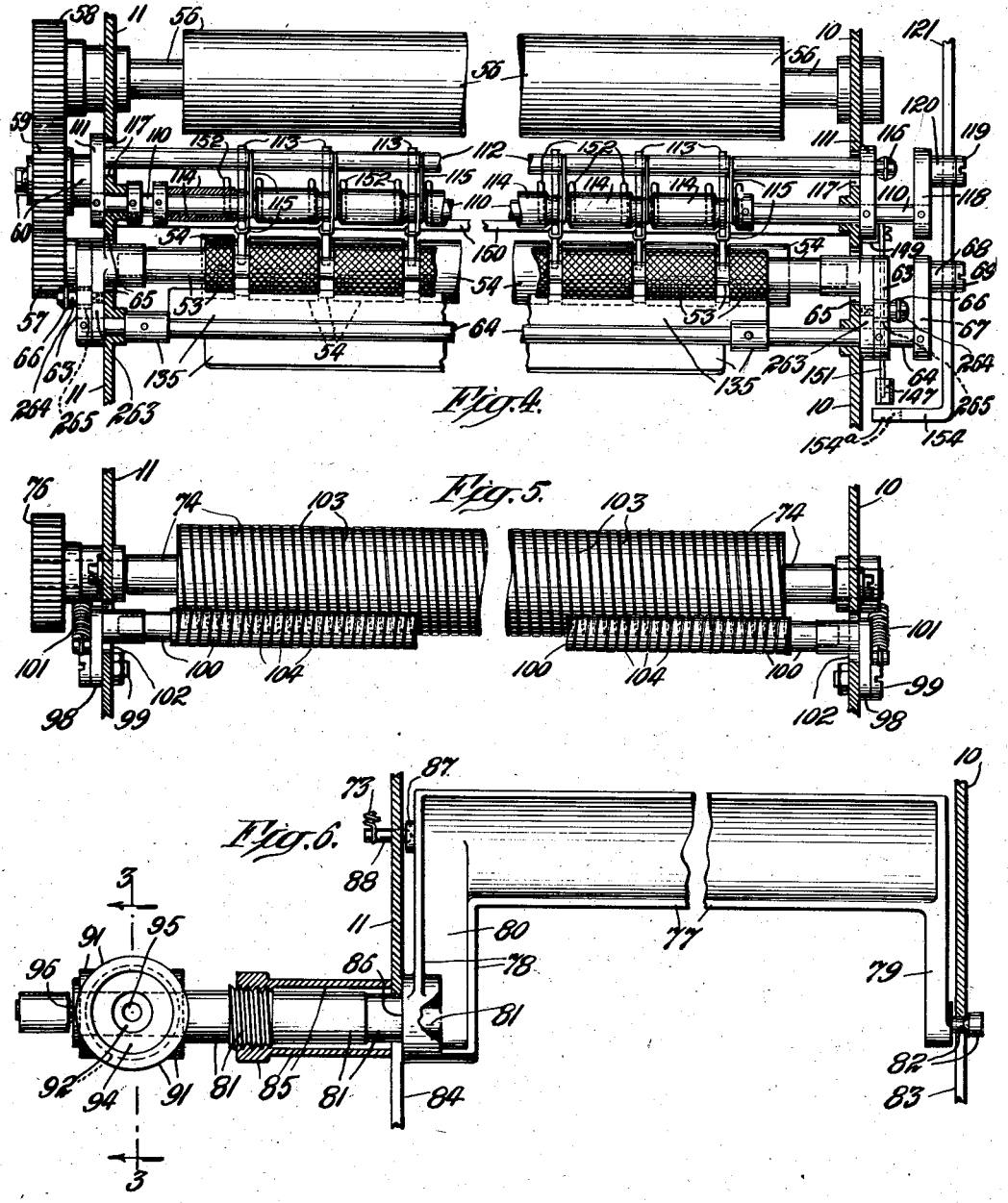
INVENTOR
John J. Flanigan
BY
Davis Davis
ATTORNEYS.

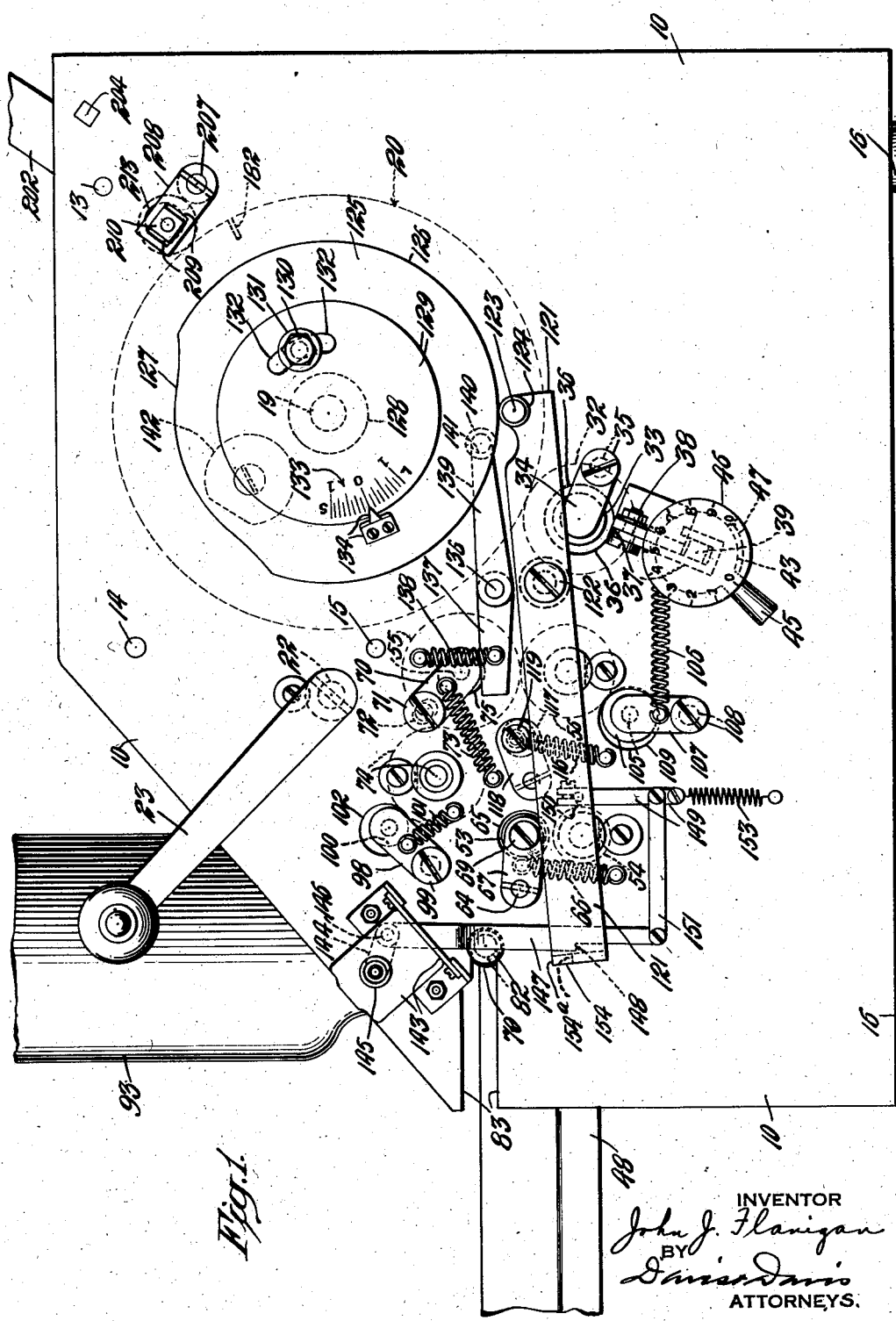

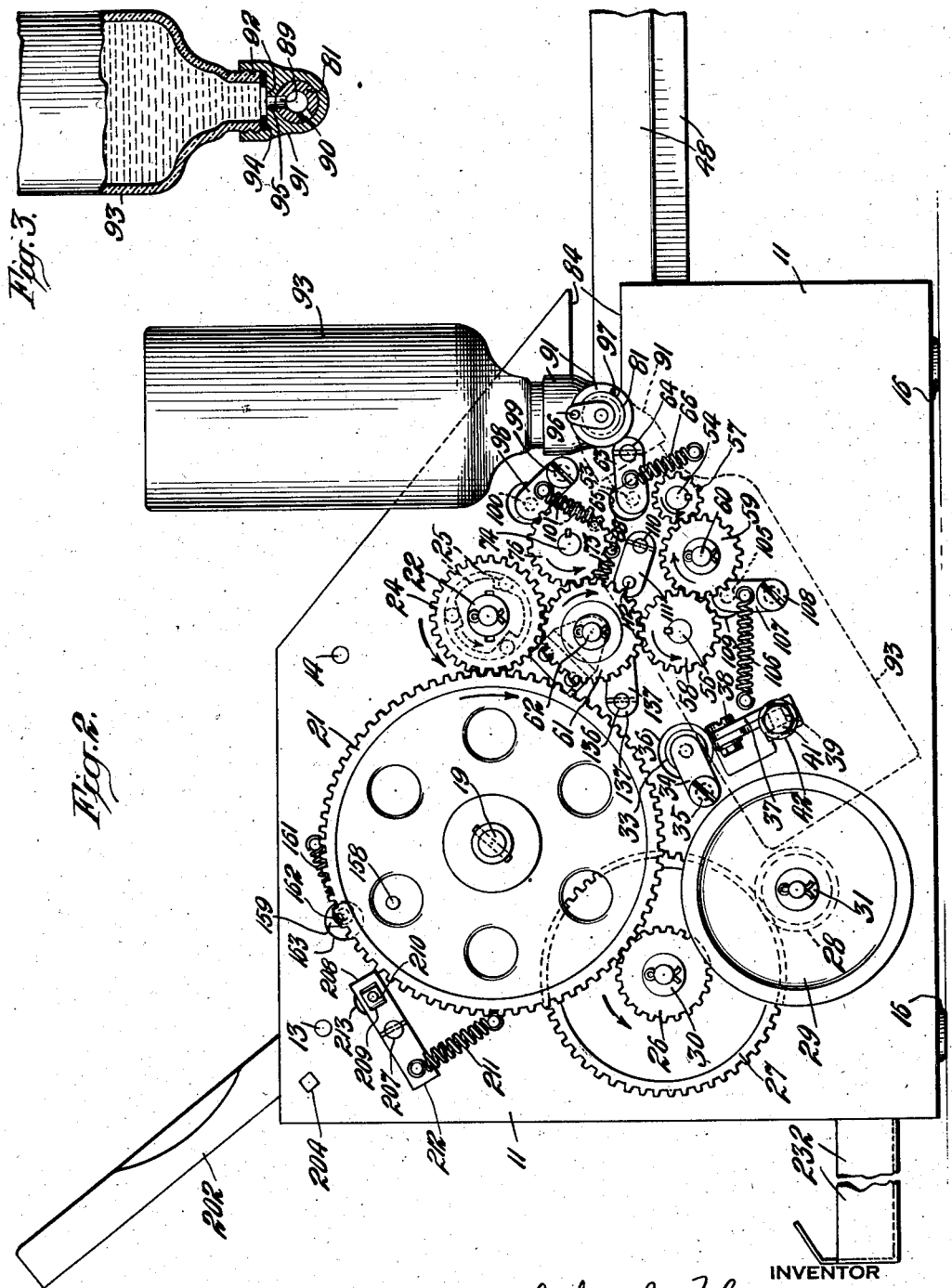

Jan. 2, 1940.　　　J. J. FLANIGAN　　　2,185,188
DUPLICATING MACHINE
Filed April 26, 1938　　　9 Sheets-Sheet 4
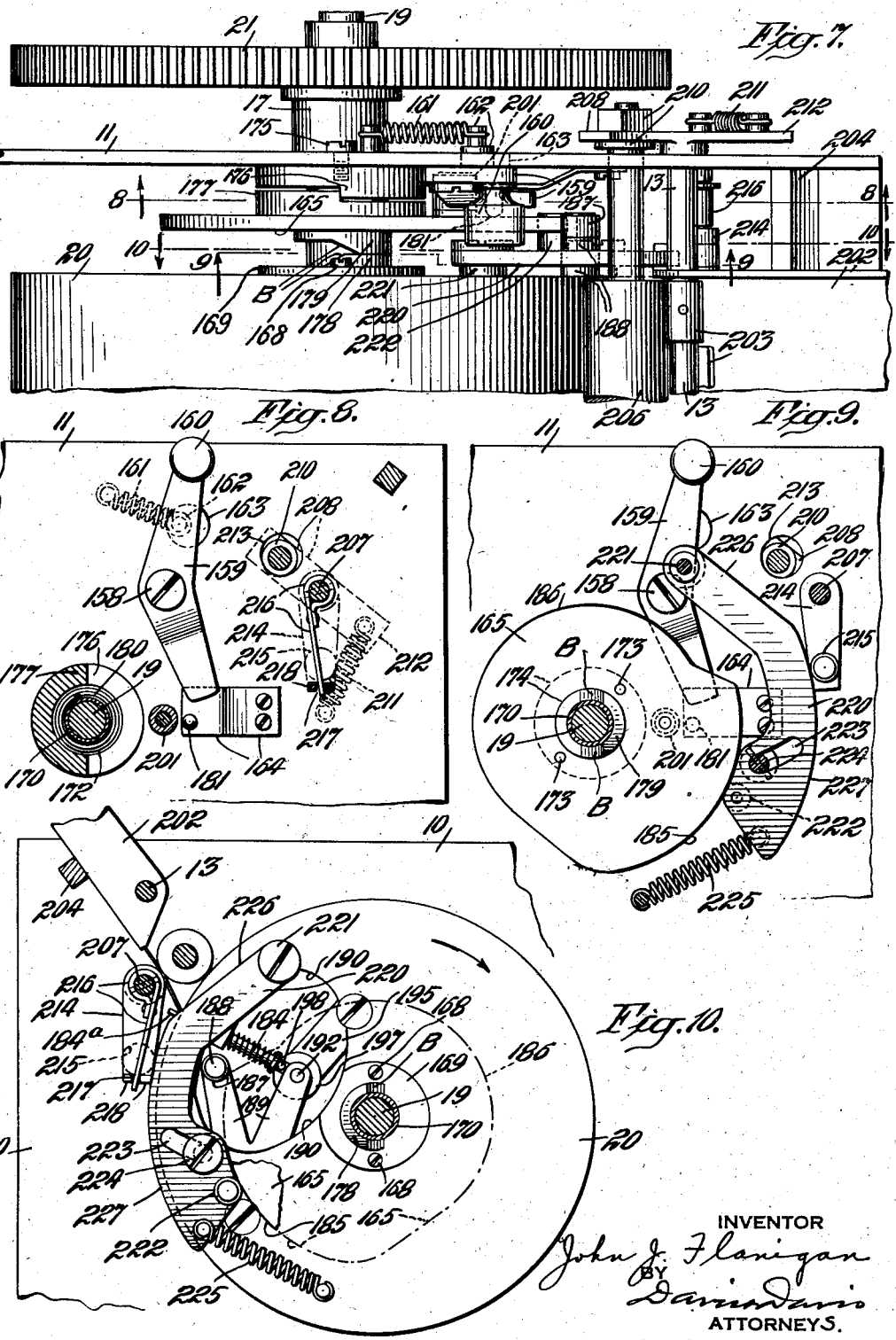
INVENTOR
John J. Flanigan
BY
Davis Davis
ATTORNEYS.

Jan. 2, 1940. J. J. FLANIGAN 2,185,188
DUPLICATING MACHINE
Filed April 26, 1938 9 Sheets-Sheet 5
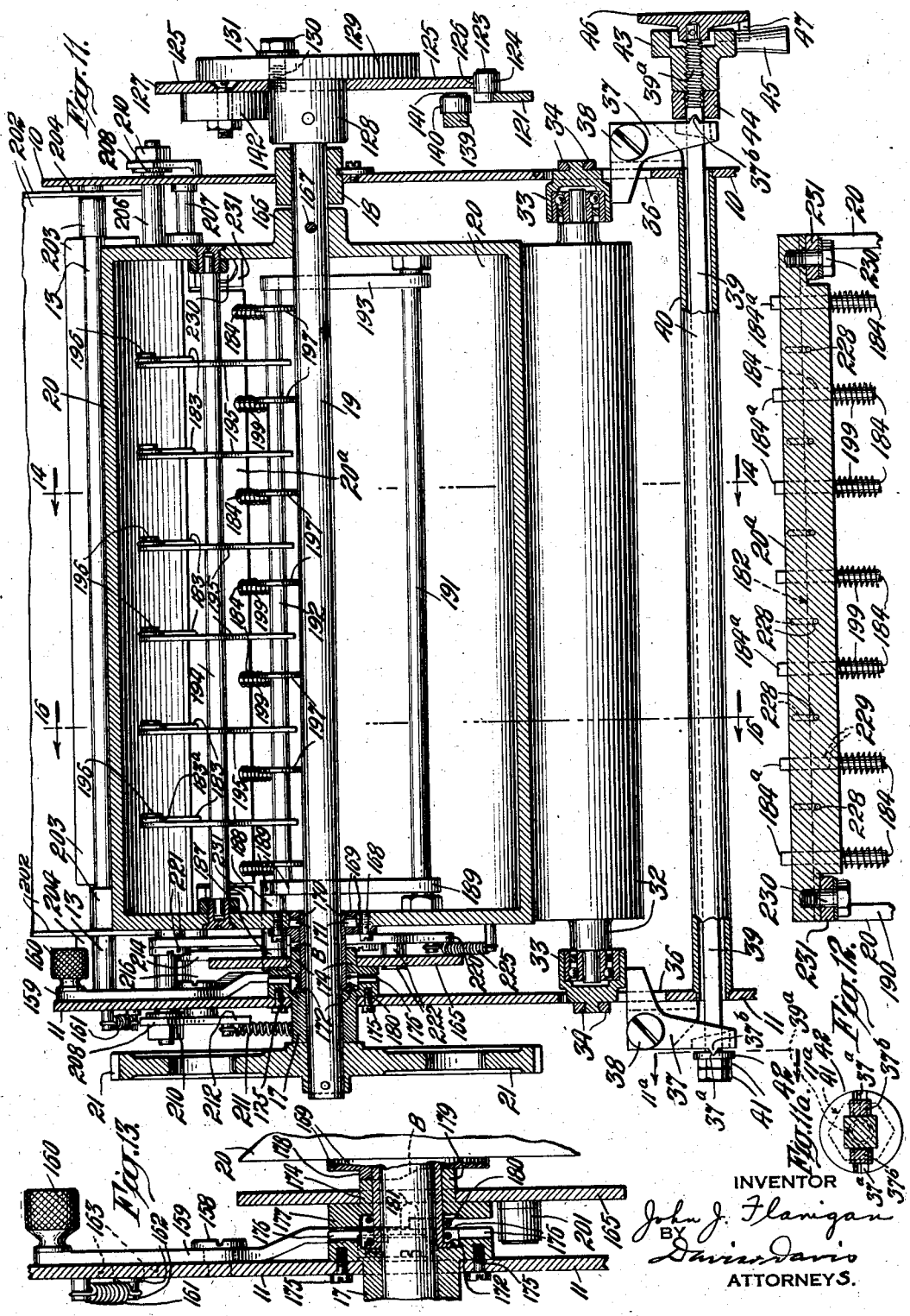
INVENTOR
John J. Flanigan
BY
Davis Davis
ATTORNEYS.

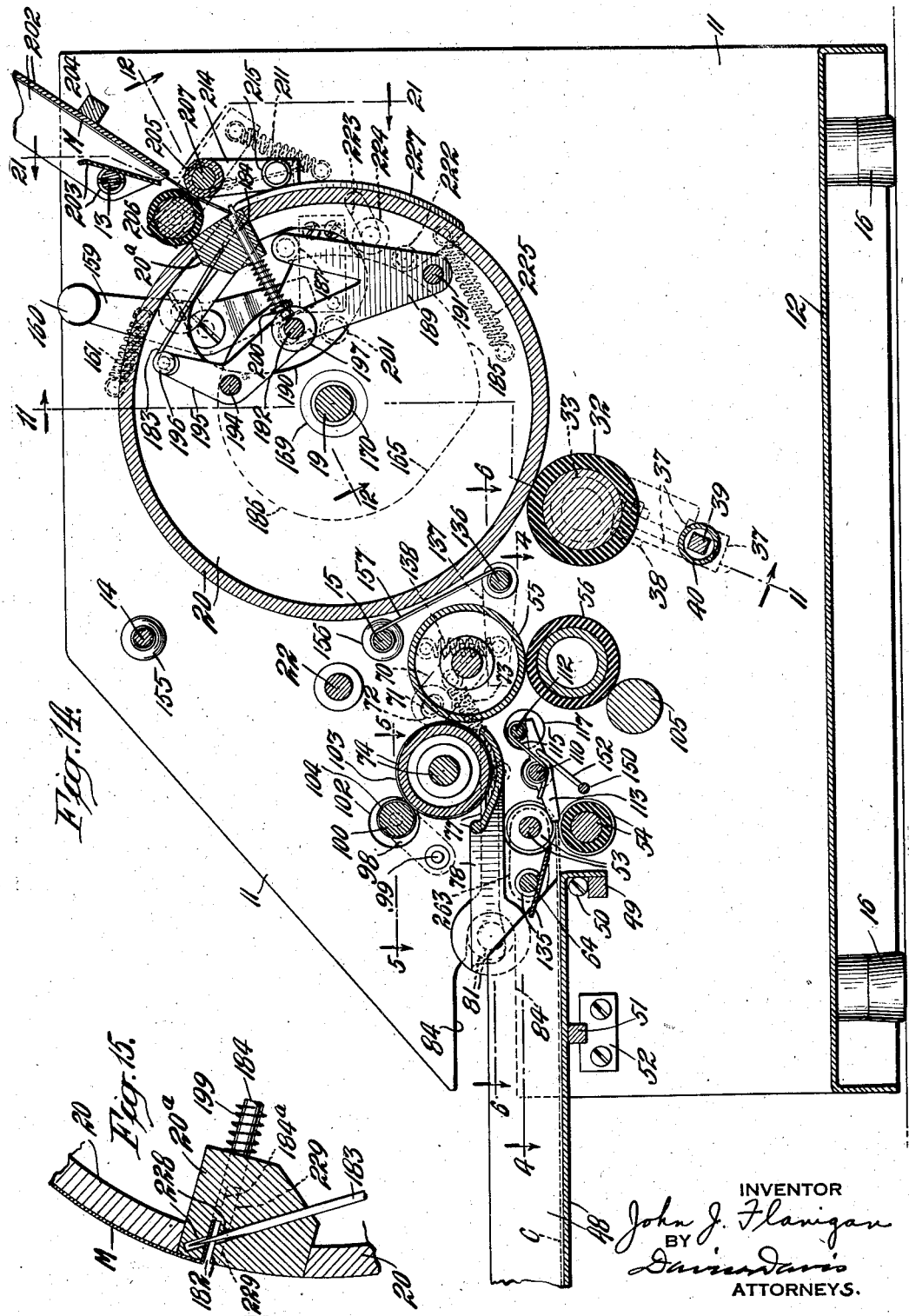

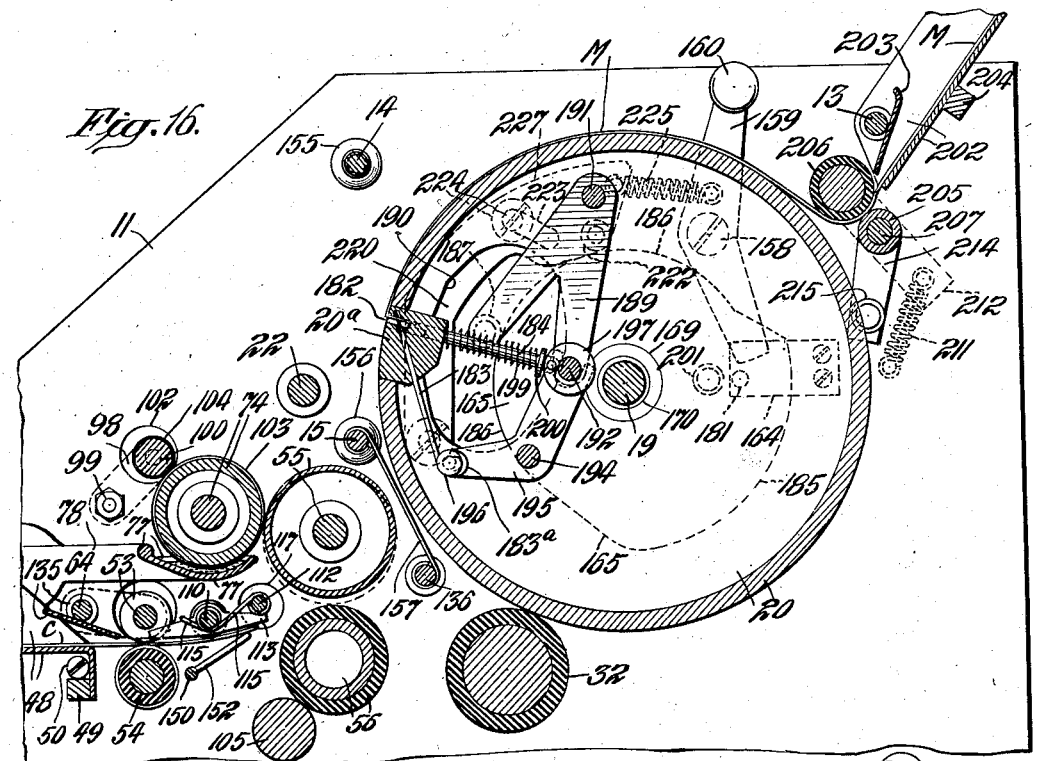
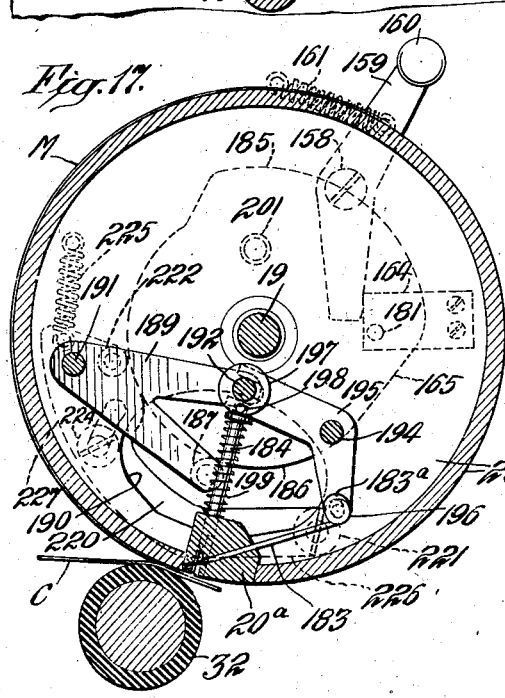
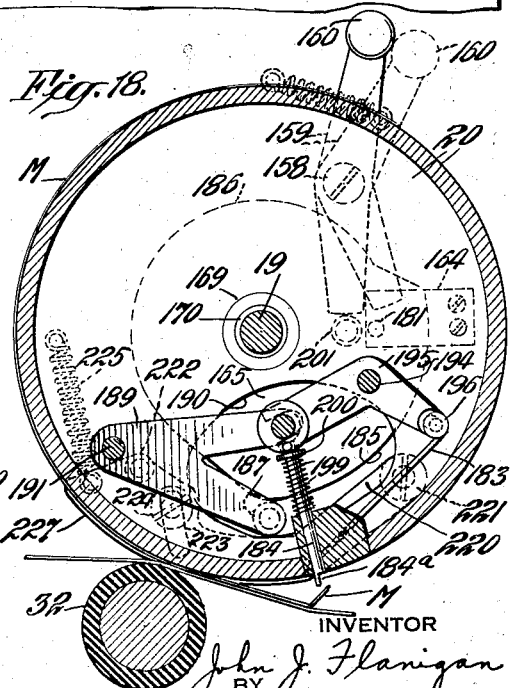

Jan. 2, 1940.   J. J. FLANIGAN   2,185,188
DUPLICATING MACHINE
Filed April 26, 1938   9 Sheets-Sheet 8
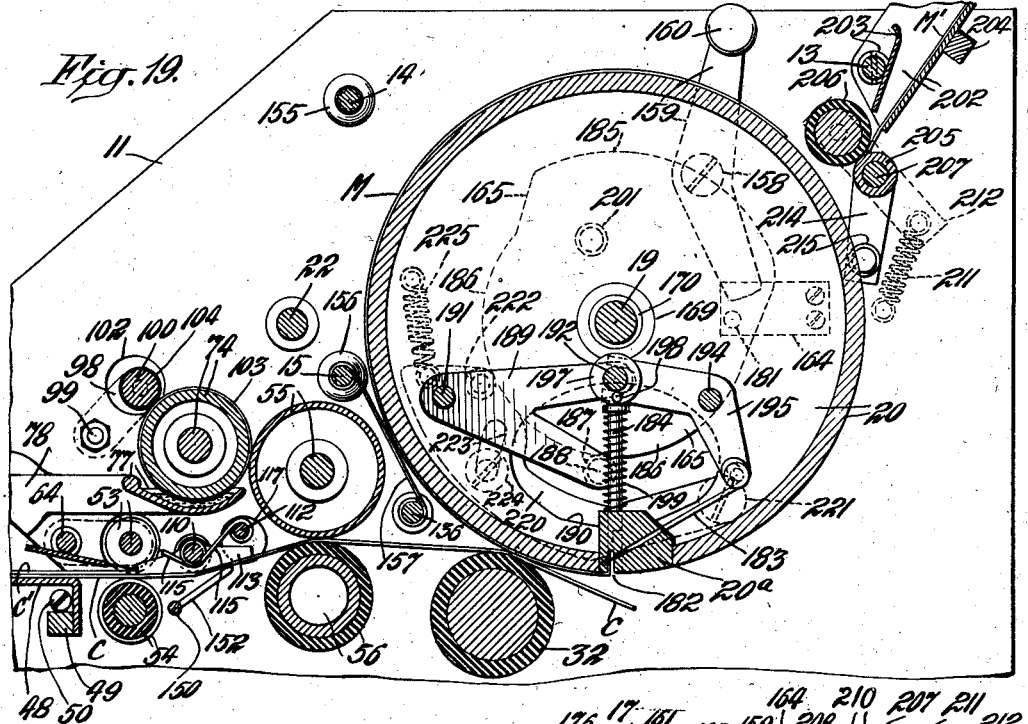
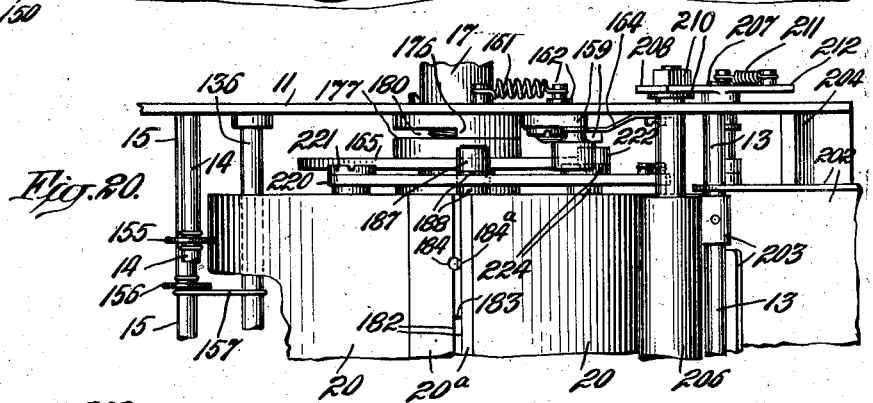
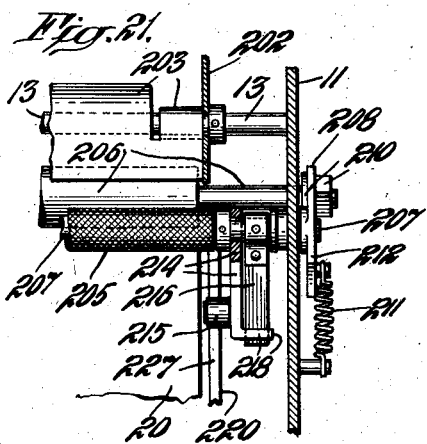
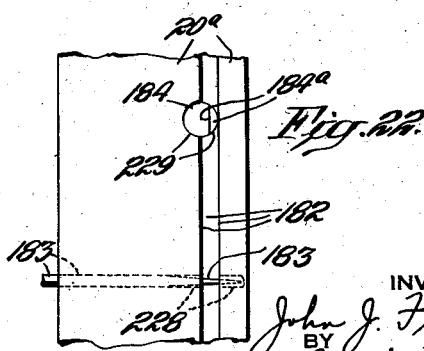
INVENTOR
John J. Flanigan
BY
ATTORNEYS.

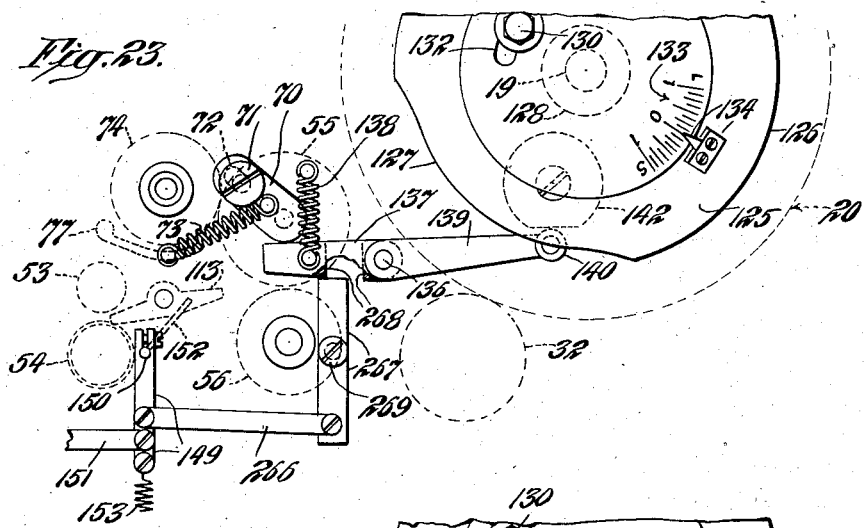
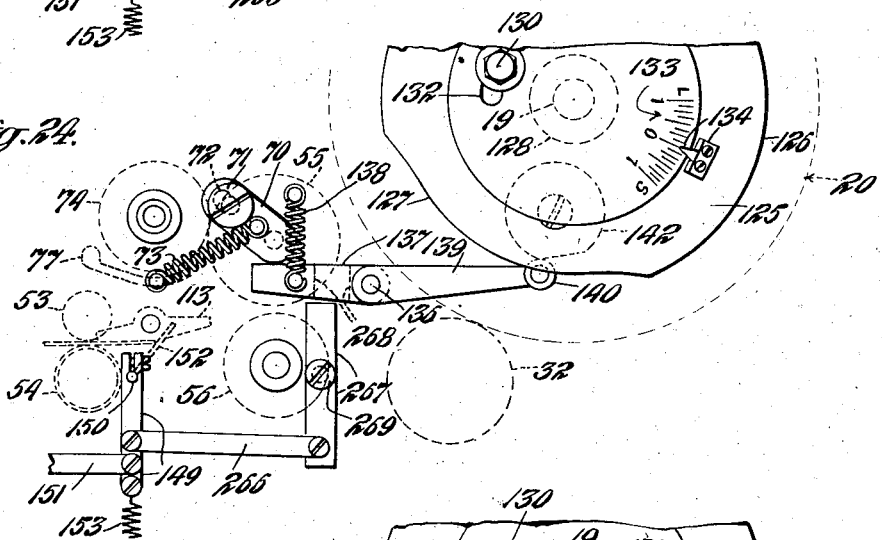
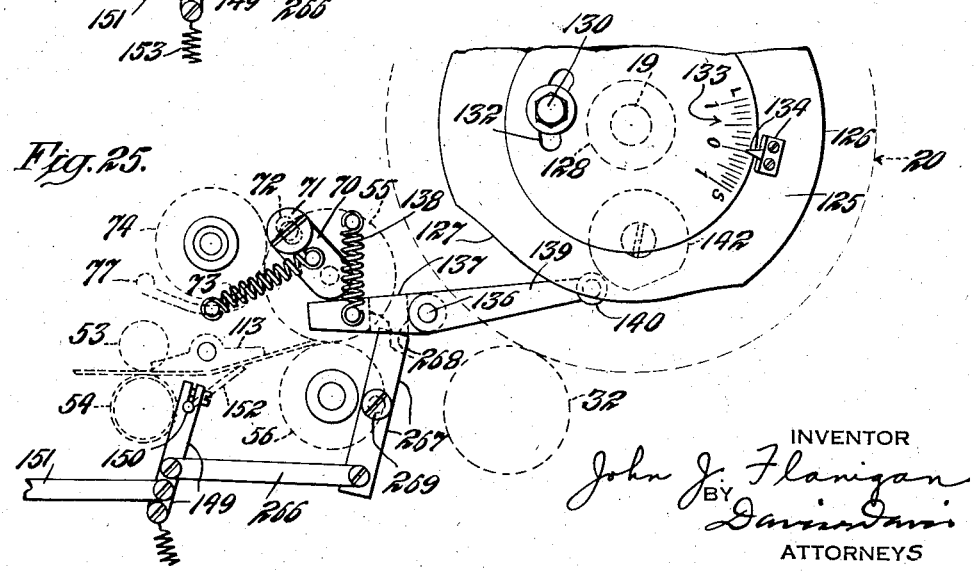

Patented Jan. 2, 1940

2,185,188

UNITED STATES PATENT OFFICE 2,185,188

DUPLICATING MACHINE

John J. Flanigan, Oak Park, Ill., assignor to L. C. Smith & Corona Typewriters, Inc., Syracuse, N. Y., a corporation of New York Application April 26, 1938, Serial No. 204,302

50 Claims. (Cl. 101—132.5)

This invention relates to duplicating machines and more particularly to duplicating machines of the kind whereby copies of matters are made by the so-called "wet process" of duplicating. In said process of duplicating a positive copy of matter delineated in reverse with a suitable copying ink upon a paper master sheet is transferred directly to a copy or clear sheet of paper which is dampened or moistened with a solvent for the ink, the moistened clear sheet being engaged under pressure with the inked face of the master sheet to effect the transfer of sufficient ink from the master sheet to the clear sheet to produce on the clear sheet a legible positive copy of the matter delineated in reverse on the master sheet.

The invention has for its general purpose to provide an improved duplicating machine of the type referred to. Specific purposes of the invention are to provide a highly efficient rotary duplicating machine for making copies by the wet process of duplication, and to increase the rate of copy output of such machines, the quality of copies made thereby, the number of copies which can be made from a given master sheet, and the ease and speed with which a change of master sheets may be effected.

To the foregoing ends, and other ends which will appear hereinafter from the description in detail of the preferred embodiment of the invention shown in the accompanying drawings, the invention consists in the combinations of devices, features of construction, and arrangements of parts hereinafter described and particularly pointed out in the appended claims.

In the drawings:

Figs. 1 and 2 are fragmentary side elevations of the machine as viewed respectively from the right and left hand sides of the machine and with the parts positioned as in Fig. 14;

Fig. 3 is a detail view partly in vertical section on the line 3—3 of Fig. 6;

Fig. 4 is a detail horizontal sectional view approximately on the line 4—4 of Fig. 14;

Fig. 5 is a detail horizontal sectional view on the line 5—5 of Fig. 14;

Fig. 6 is a detail view partly in horizontal section on the line 6—6 of Fig. 14;

Fig. 7 is a fragmentary detail plan view of the machine with the illustrated parts operatively positioned as in Fig. 14;

Fig. 8 is a detail sectional view on the line 8—8 of Fig. 7;

Fig. 9 is a detail sectional view on the line 9—9 of Fig. 7;

Fig. 10 is a detail sectional view on the line 10—10 of Fig. 7;

Fig. 11 is a fragmentary sectional view on the line 11—11 of Fig. 14;

Fig. 11ª is a sectional view on line 11ª—11ª of Fig. 11;

Fig. 12 is a detail sectional view on the line 12—12 of Fig. 14;

Fig. 13 is an enlarged fragmentary detail view on the same line as Fig. 11, but showing certain parts differently positioned;

Fig. 14 is a vertical sectional view of the machine on the line 14—14 of Fig. 11 with the working parts operatively positioned as in Figs. 1 to 12;

Fig 15 is an enlarged detail sectional view of certain parts operatively positioned as in Fig. 16;

Fig. 16 is a fragmentary sectional view of the machine taken on the line 16—16 of Fig. 11, but showing the working parts differently operatively positioned;

Fig. 17 is a view similar to Fig. 16, but showing the working parts differently positioned;

Fig. 18 is a view similar to Fig. 14, but showing the working parts differently positioned;

Fig. 19 is a view similar to Figs. 16 and 17, but showing the working parts differently positioned;

Fig. 20 is a fragmentary plan view similar to Fig. 7 but showing the working parts differently positioned;

Fig. 21 is a detail sectional view on the line 21—21 of Fig. 14;

Fig. 22 is an enlarged detail plan view showing certain of the working parts positioned as in Fig. 20; and Figs. 23, 24 and 25 are views showing a slightly modified machine at different points in the revolution of the drum and as the machine appears in side elevation viewed from the right.

Referring to the drawings, the main frame of the machine comprises right and left hand side walls 10 and 11, a bottom wall 12 connecting the side walls, and fixed tie rods 13, 14 and 15 connecting the side walls. Four rubber supporting feet 16 for the frame are attached to the bottom wall 12.

Journalled in suitable fixed bearings 17 and 18 carried by the side walls of the frame is a shaft 19 which extends axially through the duplicating cylinder or drum 20. Drum 20 is a metal drum fixed on shaft 19 and having the general form of a hollow metal cylinder with end walls or heads. A gear 21 is fixed on the left hand end of shaft 19. A drive shaft 22, journalled in suitable bearings carried by the side walls of the frame, has an operating crank handle 23 fixed on the right hand end of the shaft, and has on the left hand end of the shaft a gear 24. Gear 24 meshes with gear 21 and is connected with drive shaft 22 (as shown in dotted lines in Fig. 2) by means of a one-way drive clutch 25 of ordinary construction. By rotating crank handle 23 clockwise as viewed in Fig. 1 the drum may be rotatively driven manually.

To adapt the machine for driving thereof by an electric motor if desired, a train of gears 26, 27 and 28 and a belt pulley 29 are provided. Gears 26 and 27 have a common hub, and gear 28 and pulley 29 have a common hub, the two hubs being respectively journalled on stub shafts 30 and 31 fixed to side wall 11. Gear 26 meshes with gear 21, and gear 27 meshes with gear 28. Pulley 29 may be belt-driven from an electric motor.

For pressing copy sheets to a master sheet carried by the drum, a rubber-faced platen roller 32 is supported below the drum for sheet-pressing coaction with the drum. The shaft of the platen roller is journalled in bearings in two bearing boxes 33 fixed on two rock arms 34 supported from the frame on pivots 35 located at opposite sides of the frame. The bearing boxes are movable toward and from the drum in suitable clearance apertures 36 in the side walls of the frame to permit up and down adjustments of the platen roller toward and from the drum to control the sheet pressing pressure. These bearing boxes are held elevated by means adjustable to raise and lower said boxes simultaneously and equally.

The said adjustable supporting means includes two bellcranks 37 supported from the frame by pivots 38, each of which bellcranks has an inwardly extending arm and a pendent arm. The inwardly extending arm of each bellcrank engages under and support the adjacent bearing box 33. A bolt 39, the shank of which is of square cross section between two end portions 39ª of said shank which are reduced to cylindrical cross section and are externally threaded, extends horizontally across the frame below the platen roller through a tubular tie and housing element 40 the open ends of which are fixed in apertures in side plates 10 and 11. Bolt 39 does not contact the frame or the tube 40. The pendent arm of each bellcrank 37 is bent at its lower end upon itself, as shown, to engage the front and rear faces of the square bolt shank without engaging the upper and lower faces of the shank. The bellcranks thus hold the bolt against turning but are free to rock about their pivots. The inner end of the inner one of a pair of superposed locked nuts 41 threaded on the left hand end of the bolt is abutted by a washer 42, and the inner end of an adjusting nut 43 threaded on the right hand end of the bolt is abutted by a washer 44. Each washer has a square aperture providing a sliding fit for the washer on the square part of the bolt shank and also has a shallow diametrical groove 37ª in its inner face in which is rockably engaged a pair of pointed noses 37ᵇ formed on the pendent arm of the adjacent bellcrank. Bolt 39 is suspended by the bellcranks and washers. Nut 43 is formed with an integral radially extending handle 45 for screwing up the nut to adjust bearing blocks 33 upward equally and simultaneously and backing off the nut to lower the blocks equally and simultaneously. A dial or indicator plate 46, graduated for coaction with handle 45 to indicate the adjusted relation of the platen roller to the drum, is fixed to bolt 39 and formed with an adjustment limiting stop lug 47 for engagement by handle 45.

Since the rubber-faced platen roller is constantly held pressed to the drum it will rotate under the tractive effect of the drum and at the same peripheral speed as the drum during rotative driving of the drum. The master sheet from which the copies are to be made is held to the drum at one end (the leading end of the sheet with respect to the direction of rotation of the drum) and is otherwise free from the drum, the inked face of the attached master sheet being outermost. Means, hereinafter described, are provided whereby the operator may, at will, effect disconnection of an attached master sheet from the drum, discharge of such sheet from the machine, and the supply of a new master sheet and connection thereof to the drug, all without interruption of either drum rotation or the regular feed of copy sheets to the machine.

The machine is provided with copy sheet feeding, moistening and counting means which will now be described for feeding copy sheets one at a time at proper intervals substantially horizontally from the front of the machine into the bight of the drum and platen roller, properly moistening the upper face of each fed sheet during its transit to the bight of the drum and platen roller and counting and visually registering the number of copy sheets fed to the bight of the drum and platen roller.

Attached at its rear end to the front portion of the frame and extending forward from the frame is a horizontally disposed copy sheet feed table 48, preferably formed of sheet metal with longitudinal side flanges as shown. For convenience this table is detachably held to the frame by engagement of the ends of a transverse metal bar 49 under the heads of two screws 50 tapped in the frame side walls and by engagement of the ends of a transverse metal bar 51 in notches in the upper edges of two metal blocks 52 fixed to the frame side walls. The bars 49 and 51 are welded to the table, the blocks 52 and the heads of screws 50 are at the inner faces of the frame side walls, and the rear end of the table lies between the frame side walls.

Closely adjacent the rear end of the feed table 48 is a pair of directly superposed introductory feed rolls or rollers 53 and 54, between which pair of rolls and the superposed drum and platen roller there is located a pair of superposed supplementary feed rollers or rolls 55 and 56 the upper one of which latter pair of rolls functions also as a moisture applying roll. The bight of the pair of rolls 53, 54 is preferably level with the sheet supporting face of table 48 and slightly lower than the level of the bight of the drum and platen roller, while the level of the bight of the pair of rolls 55, 56 is preferably substantially the same as that of the drum and platen roller, as shown. Rolls 53 and 54 are formed at intervals thereon with annular grooves, the grooves of each roller registering with those of the other. Roll 53 is a knurled metal roller, roll 54 is a rubber-faced roller, roll 55 is a smooth metal roller, and roll 56 is a smooth rubber-faced rubber.

The shaft portions of rollers 54 and 56 are journalled in the side walls 10 and 11 of the frame, and gears 57 and 58 fixed respectively on the left hand end of the shaft portion of roller 54 and the left hand end of the shaft portion of roller 56 mesh with an intermediate gear 59 journalled on a stub shaft 60 fixed to the side wall 11 of the frame. An intermediate gear 61, journalled on a stub shaft 62 fixed to frame side wall 11, meshes with gears 58 and 24.

The shaft portion of roller 53 is journalled at its ends in suitable bearings formed on a pair of rock arms 263 loosely pivoted on a rock shaft 64. Studs 264 fixed to arms 263 extend through holes 265 of somewhat greater diameter than the studs and formed in a pair of rock arms 63 fixed on shaft 64. Shaft 64 is journalled in the side walls of the frame to permit roller 53 to be moved up and down out of and into contact with roller 54, the frame side walls having clearance apertures 65 to permit such up and down movement of the roller 53. Springs 66 connected to the studs 264 and to the frame side walls normally urge roller 53 down to roller 54. In its lowered position roller 53 will be driven by the tractive effect of roller 54, and in its raised position roller 53 will not be rotatively driven. Fixed on the right hand end of rock shaft 64 is a rearwardly extending rock arm 67 on which is journalled on a horizontal pivot 69 a small outwardly extending contact roll 68 for contact by means hereinafter described for lifting roller 53. A rearwardly and downwardly inclined copy-sheet deflector plate 135 is preferably fixed on shaft 64 in front of roller 53 and above the level of the sheet-supporting face of table 48.

The combined moisture applying and secondary feed roller 55 is supported for slight movement down and up into and out of contact with its cooperating secondary feed roll 56 without losing contact with a moisture supplying roller 74. To this end, the shaft portion of roller 55 is journalled at its ends in the lower ends of a pair of rearwardly and downwardly inclined links or arms 70 supported on pivots 71 on the side walls of the frame, each link having adjacent its upper end a short longitudinal slot 72 through which the link pivot extends. Springs 73, connected to the links and the side walls of the frame and extending forward and downward from the links, constant yieldingly hold roller 55 to the moisture supplying roller 74 and also normally yieldingly urge roller 55 into contact with roller 56. Roller 74 is supported at a slightly higher level than roller 55 and in front of roller 55. Means hereinafter described are provided for acting on the lower ends of the links 70 to lift roller 55 against the resistance of springs 73. Suitable clearance apertures 75 are provided in the side walls to permit the up and down movement of roller 55.

Moisture supplying roller 74 is a metal roller having its shaft portion journalled in suitable bearings in the side walls of the frame, the shaft portion of said roller at the left hand end of the roller having fixed thereon a gear 76 which meshes with gear 61. The moisture applying roll 55 is driven by the tractive effect thereon of the moisture supply roll 74. The lower portion of roller 74 lies within a removable liquid-supply containing trough 77 having forwardly extending horizontal arms 78 and 79 at its ends. Arm 78 is formed with a supply channel 80 the bottom of which is level with the bottom of the trough, said channel opening at its rear end to the trough and adjacent its forward end opening to a horizontal tubular conduit 81 which is rigid with, and extends leftward from, arm 78. Arm 79 of the trough has a horizontal stud 82 extending therefrom toward the right and located opposite conduit 81. Stud 82 has at its outer end a head the inner end of which tapers toward the shank of the stud. The side walls 10 and 11 of the frame are formed respectively with horizontal slots 83 and 84 open at their front ends and extending rearwardly from the front edges of the walls.

The trough is removably held in place in the frame, with the conduit extending through the rear end of slot 84 and with the stud extending through the rear end of slot 83, by means of a clamping nut 85 threaded on the conduit and screwed up against the outer face of wall 11 to clamp a shoulder 86 (formed on the conduit) against the inner face of wall 11, to hold a recessed boss 87 on arm 78 fitted over the inner end of a pin 88 mounted on wall 11, and to hold the tapered portion of the head of stud 82 in an enlarged rounded rear end portion of slot 83, all as more clearly shown in Figs. 1 and 6. By backing off nut 85 the trough may be shifted slightly to the right and then drawn forward out of the frame.

The conduit has extending therethrough near its outer or left hand end a vertical port 89 which communicates with the top of the conduit and a rearwardly and downwardly inclined port 90 which communicates with the bottom of the conduit. A valve body 91, mounted on the conduit adjacent the left hand end of the conduit for oscillation about the conduit, is formed with a threaded socket 92 to receive the threaded neck of a liquid supply reservoir or bottle 93. The bottle neck is screwed into the socket against an annular packing washer or gasket 94, and a port 95 leading from the bottom of the socket is shiftable into communication with port 89 by swinging of the reservoir into the vertical up-ended position shown in Figs. 1, 2 and 3, and is shiftable into communication with port 90 by swinging of the reservoir into the rearwardly and downwardly inclined position shown in dotted lines in Fig. 2. Pin and socket releasable latching means including pin 96 supported from the conduit and two suitably arranged sockets 97 (one of which is shown in Fig. 2 and in the other one of which the pin is engaged in the position of the reservoir shown in Fig. 2) are provided for releasably holding the reservoir and valve body in the two described and illustrated positions.

When the machine is in use the reservoir is latched in its up-ended position and until its liquid supply is exhausted a constant level of liquid will be maintained in the trough 77 by the barometric feed to the trough which the described arrangement provides. By swinging the reservoir and valve body into the position shown in dotted lines in Fig. 2, the fluid in the trough may be drained into the reservoir and there retained during non-use of the machine. When the valve body is in the last-mentioned position the reservoir may be readily detached from the valve body for re-filling and readily attached when full to the valve body.

A pair of upwardly and rearwardly extending rock arms 98 held at their lower ends by pivots 99 to the frame side walls have journalled in bearings in their upper ends the ends of the shaft portion of a metal roller 100 the main body portion of which extends throughout the length of the main body portion of roller 74 and is yieldingly held thereagainst along the upper front portion thereof by springs 101 connected with the rock arms and the frame side walls. Clearance apertures 102 in the frame side walls permit limited movement of roller 100 toward and from roller 74. Roller 100 is of much smaller diameter than roller 74 and is driven during operation of the machine by the tractive effect of roller 74 on roller 100. The main body portion of each of the rollers 74 and 100 has formed in its peripheral face a shallow helical groove extending repeatedly around the main body of the roller and from end to end of the main body of the roller, the direction of winding of the helical groove in one roller being opposite to that in the other roller. The groove in roller 74 is designated 103 and that in roller 100 is designated 104.

A smooth surfaced metal roller 105 beneath roller 56 is yieldingly held to the latter roller by springs 106, the roller 105 having its shaft portion journalled in bearings in rock arms 107 mounted on pivots 108 held to the frame side walls, and the springs 106 being connected to said rock arms and the frame side walls to yieldingly hold roller 105 to roller 56. Clearance apertures 109 in the frame side walls permit limited movement of roller 105 toward and from roller 56.

A horizontal rock shaft 110, journalled in bearings in the side walls of the frame and located at a level higher than the top of feed roll 54 and higher than the axis of feed roll 56, has fixed thereon a pair of rearwardly extending rock arms 111 to the rear ends of which are fixed the ends of a rod 112. Shaft 110 and rod 112 extend across the machine between the two pairs of rollers 53—54 and 55—56. Mounted on rock shaft 110 is a series of combined copy-sheet stop and registering levers 113 each of which is loosely pivoted substantially midway its ends on said rock shaft. Spacing sleeves 114 on the rock shaft hold the levers 113 spaced apart along the rock shaft. Each lever 113 has associated therewith one of a series of springs 115, which spring is coiled about the shaft 110 and has one end thereof bent about rod 112 in one of a series of annular grooves in said rod and has its opposite end hooked over the forwardly extending arm of the lever (see Fig. 4) to normally yieldingly urge the rearwardly extending arm of the lever upward against rod 112 which overhangs said arm and to normally yieldingly urge the forward arm of the lever downward.

A spring 116 is connected to frame side wall 10 and to the right hand one of the rock arms 111 to normally pull rod 112 downward. The grooves in roller 53 are relatively deep to permit lifting of the forward ends of levers 113 above the top of roller 54 by the downward thrust of rod 112 on the rear ends of the levers when rod 112 is pulled down from its raised position of Fig. 14 to its lowered position of Fig. 16. In the raised position of rod 112 the springs 115 will normally yieldingly urge levers 113 into the position shown in Fig. 14 in which the forward end of each lever lies partly in both ones of the adjacent pair of registering annular grooves in rollers 53 and 54. Clearance apertures 117 are provided in the frame side walls to permit the described movement of rod 112.

Fixed on the right hand end of rock shaft 110 is a rearwardly extending rock arm 118 having journalled thereon near the rear end of said arm on a horizontal pivot 119 an outwardly extending contact roll 120. A fore-and-aft extending lever 121, pivoted intermediate its ends on a horizontal pivot 122 held to frame side wall 10, has its forward arm engaged under both the contact roll 120 on rock arm 118 and the contact roll 68 on rock arm 67, and has journalled on its rear arm on a horizontal pivot 123 a roller follower 124 which is engaged under a disk cam 125. Cam 125 rotates with the drum about the drum axis and has high and low edge portions 126 and 127 which are concentric with the drum axis. Rotation of the cam vibrates lever 121 to effect periodic raising and lowering of feed roller 53 and periodic rocking of the combined sheet stopping and registering levers 113, thereby providing for the feeding of a single moistened copy sheet to the bight of the drum and platen roller during each revolution of the drum.

The cam 125 so times the start of feed of each copy sheet that the leading end of the copy sheet and the leading or anchored end of the master sheet arrive at the bight of the drum and platen roller at approximately the same time. To vary the relative times of arrival to thereby vary the upper clear margin which will be left on the printed copy sheet, the cam 125 is so mounted as to be rotatively adjustable to a limited extent about the drum shaft. To this end the cam disk is mounted on the inwardly extending hub 128 of a metal disk 129 for turning of the cam disk about its axis relatively to the hub. The hub 128 is fixed to the drum shaft 19, and the cam 125 is held tightly to the inner face of the disk 129 by a clamping bolt 130 and a washer 131. The shank of bolt 130 extends through washer 131 and an arcuate slot 132 in disk 129 and is threaded into cam 125. Slot 132 is concentric with the shaft 19. The outer face of the disk is provided with suitable margin indicating graduations 133 coactive with a suitable metal pointer or finger 134 fixed to the outer face of the same 125.

Cam 125 actuates also means for lifting the moisture applying roller 55 for an instant and allowing it to move back into contact with roller 56 during the advance of each copy sheet by rollers 53 and 54 and before the leading end of said sheet reaches rollers 55 and 56. This momentary opening of rollers 55 and 56 will allow any excess moisture which may have accumulated in the bight of these rollers to be carried away ahead of the copy sheet. Roller 105 substantially entirely prevents any such moisture from being carried around to the under face of the sheet by roller 56. The lifting means for roller 55 comprises a rock shaft 136 journalled in bearings in the frame side walls and extending across the frame between roller 55 and drum 20. Two forwardly extending rock arms 137 fixed to shaft 136 are held lightly in contact with the lower rear ends of links 70 by spring 138 which are of insufficient strength to lift roller 55. A rearwardly extending rock arm 139 fixed on shaft 136 carries at its rear end an outwardly extending contact roller 140 journaled on a pivot 141 held to the arm. Bolted to cam 125, at the inner face of the cam and near the leading end of the low edge portion 127 of the cam, is a trip stud or block 142 adapted to wipe past roller 140 and depress it and arm 139 for a brief period during each revolution of the drum.

A counting register 143 of ordinary construction, having the usual actuating rock arm 144 and the usual resetting finger wheel or knob 145, is fixedly held to the outer face of frame wall 10 adjacent the front end of the machine. Pivotally held to arm 144 of the register at 146 to swing fore-and-aft of the machine, and dependiny from said arm, is a thrust link 147 having at its front edge a downwardly facing shoulder 148. A rock arm 149, fixed to and depending from a horizontal rock shaft 150, is connected adjacent its lower end to the lower end of link 147 by a fore-and-aft extending link 151. Shaft 150 extends across the machine behind roller 54 and is journalled in bearings in the side walls of the frame. Extending rearwardly from and fixed to shaft 150 are sheet-feeding rock arms 152 arranged in pairs (one pair for each sheet stop lever 113) to swing upwardly across the path of feed of copy sheets into a position in which the rearwardly extending arm of each lever 113 extends between the arms of one of the pairs of feeler arms 152. The feeler arms 152 are normally yieldingly held in this position, and the rock arm 149 and link 147 are normally held vertically disposed, all by means of a light pull spring 153 which is connected at its upper end to the lower end of arm 149 and is connected at its lower end to frame wall 10 at a point in the same vertical plane in which lies the axis of rock shaft 150. Lever 121 is formed at its front end with an inwardly extending lug 154 having a reduced inner end portion or extension 154ᵃ in front of link 147.

In the normal vertical position of link 147, extension 154ᵃ of lug 154 will move up and down in front of the link 147 during vibration of lever 121 without actuating the link. When a copy sheet is fed between the set of levers 113 and the set of feeler arms 152, the sheet will force the feeler arms downward, thereby causing arm 149 and link 151 to swing link 147 forward far enough to position shoulder 148 on the link 147 over the extension 154ᵃ of lug 154 so that, as the front end of lever 121 rises thereafter from its lowered position to its raised position, link 147 will be thrust upward and actuate the register. Idle revolutions of the drum will not be counted by the register, but only those revolutions which are accompanied by feeding of a copy sheet. The feeler arms 152 and stop levers 113 assist in guiding the copy sheet through the machine.

Any suitable means may be provided for preventing the master sheet anchored to the drum from dropping over upon the copy sheet feeding and moistening means. The means shown comprises a set of small spaced disks 155 rotatively mounted on tie rod 14, a similar set of disks 156 rotatively mounted on tie rod 15, and a set of spaced wires 157 which extend between rod 15 and shaft 136 with the ends of each wire bent about said rod and said shaft.

Manually controlled, automatically operating means are provided for at will feeding a master sheet to the drum and anchoring it to the drum, and for releasing an anchored master sheet from the drum for discharge thereof from the machine without interrupting the operation of the machine, said means being manually settable at will to effect, during a single revolution of the drum, the release and discharge of a used master sheet and the feeding in and anchoring of a new master sheet. Said means will now be described.

Pivotally held to frame side wall 11 by a pivot 158 to swing fore-and-aft of the machine is a manually settable upstanding two-armed control lever 159 having at its upper end on its upper arm and adjacent the top of the machine a handle 160. A spring 161 connected to side wall 11 and to a stud 162 on the control lever normally yieldingly urges said lever to, and holds it in the un-set or inactive position shown in Figs. 2, 7, 8, 9, 11, 14 and 16, with stud 162 engaged with the forward edge portion of a clearance aperture 163 in wall 11, and with the lower arm of the lever engaged with the inner face of a laterally flexible spring latching arm or tongue 164 which is anchored to wall 11 and is normally held slightly flexed outward by the lower arm of lever 159. Latch 164 is adapted to snap or flex inward into latching position behind the lower arm of lever 159 to releasably hold said lever in the set or active position thereof shown in Figs. 13, 17 and 18.

Control lever 159 is the manual control element of a manually controlled automatic clutch mechanism settable at will by said lever to automatically un-clutch from, and lock against rotation with, the drum at a definite point in the revolution of the drum and to re-clutch to the drum at said point upon the completion of a single revolution of the drum, a cam disk 165 which is normally clutched to the drum to rotate therewith about the drum axis. The right hand head of drum 20 is formed with a sleeve 166 pinned to drum shaft 19 by a pin 167. The left hand head of the drum has fixed thereto by screws 168 a flanged sleeve 169 which embraces the inner end portion of a sleeve 170. Sleeve 170 is pinned by pins 171 to sleeve 169 and embraces the drum shaft, said sleeve 170 extending outward to the inner end of the left hand bearing sleeve 17 of the drum shaft and being formed around its outer end with an annular flange 172 abutting bearing sleeve 17. Cam 165 is held fixed by fastenings 173 to a hub 174 which is rotatively journalled on sleeve 170.

Bearing sleeve 17 is held fixed to frame wall 11 by screws 175 and is formed at its inner end with an annular flange which encircles the outer end portion of sleeve 170 and is reduced in depth throughout half of its circumference to provide a semi-cylindrical fixed stop projection 176. Hub 174 of cam 165 is formed at its outer end with an annular flange which is opposed to the annular flange on bearing sleeve 17 and is reduced in depth throughout half its circumference to provide a semi-cylindrical stop projection 177 on the hub. These two recessed annular flanges may be interlocked end to end and separated at one point only in the rotation of drum by axial movement of cam 165 and, when interlocked, will positively lock cam 165 against rotation about the drum shaft.

The outer end of the sleeve 169 and the inner end of hub 174 of cam 165, are cut back from their opposed ends throughout substantially half the circumference of each to form a releasable clutch for clutching the cam to and unclutching it from the drum at a single point only in the rotation of the drum. The cutting back of sleeve 169 and hub 174 is such as to leave a substantially semi-cylindrical projection 178 on sleeve 169 and a substantially semi-cylindrical projection 179 on hub 174, those edges of which projections which take the driving thrust when the clutch members are interlocked being beveled or inclined as shown at B (Figs. 7, 9 and 10) to permit said interlocked clutch members to cam themselves out of engagement when cam 165 is held against rotation.

A spring 180, coiled about sleeve 170 and bearing against hub 174 and the flange 172 on sleeve 170, normally forces cam 165 and its hub 174 toward the right hand side of the machine to hold the cam clutched to the drum and hold the stop members 176 and 177 out of interlocked engagement. During movement of the cam 165 toward the left into unclutched and locked position, as more fully hereinafter described, the cam will press outward against a stud 181 on the free forward end of resilient latch arm 164 and flex the latter toward the left to release control lever 159 from its set position of Figs. 17 and 18, whereupon lever 159 will be restored to normal position by spring 161.

For releasably locking a master sheet to the drum, the drum is provided with a narrow and shallow slot 182 which throughout the length of the drum extends inward radially of the drum from the drum periphery for a short distance, and the drum carries a set of master sheet locking pins 183 which are spaced apart longitudinally of the slot and are reciprocable across the slot through the end portion of a master sheet engaged in the slot for releasably locking or pinning said end portion of the master sheet to the drum within the periphery of the drum. The drum also caries a set of plungers 184 which are spaced apart longitudinally of the drum and are reciprocable radially of the drum through slot 182 to assist in the introduction of the end portion of a master sheet into the slot for pinning of said sheet end portion to the drum and to positively eject said sheet end portion from the slot when said end portion is subsequently unpinned. Plungers 184 are provided at their outer ends with longitudinal extensions 184a.

Cam 165 has high and low peripheral edges 185 and 186 concentric with its axis and that of drum shaft 19 and controls mechanism for reciprocating the set of pins 183 and the set of plungers 184 in such manner that the pins are retracted as the plungers are projected and vice versa. This mechanism comprises a roller follower 187 coactive with the periphery of cam 165 and journalled on a wrist member 188 held to one arm of a bellcrank 189. Said wrist member extends outward through a clearance aperture 190 in the left hand head of drum 20. Bellcrank 189 is located within the drum adjacent the left hand end of the drum and is fixed on a rock shaft 191. Shaft 191 extends longitudinally of the drum within the drum and is journalled in bearings on the heads of the drum. The other arm of bellcrank 189 is connected by a tie rod 192 with a rock arm 193 fixed on shaft 191 within the drum near the right hand head of the drum, rod 192 and shaft 191 both extending parallel to the drum axis. Rod 192 lies substantially directly between drum shaft 19 and the drum slot 182.

Within the drum at the opposite side of rod 192 from rock shaft 191 is a second rock shaft 194 parallel to shaft 191 and journalled in bearings on the heads of the drum. Spaced along and fixed to the rock shaft 194 are bellcranks 195 each of which has an arm extending to rod 192 provided with a forked or longitudinally slotted end through which said rod extends for rocking the bellcranks 195. The other arm of each bellcrank extends outwardly toward the cylindrical wall of the drum and carries adjacent its outer end a laterally extending headed stud 196. Pins 183 are connected at their inner ends to studs 196, each pin being formed with a pivot eye 183a through which the stud stank extends, which eye is slightly elongated in the direction of the length of the stud-carrying arm of the associated bellcrank 195. Rotatively mounted on rod 192 are washers or rings 197 each connected by a horizontal pivot 198 to the inner end of a different one of the plungers 184. Springs 199, coiled about plungers 184 and interposed between the drum and a suitable collar 200 on each plunger, normally hold the plungers 184 fully retracted and the pins 183 fully projected and yieldingly hold follower 187 to the periphery of cam 165.

The follower is engaged with the low edge portion 186 of cam 165 during rotation of said cam with the drum. Cam 165 has extending outward or toward the left therefrom a roller 201 journalled on a horizontal pivot fixed to the cam, said roller being so located as to pass the manually settable control lever 159 when the latter is in normal unset position, but to engage under the lower end of said lever and thereby stall or stop rotation of the cam at a fixed point in the revolution of the drum (as shown in dotted lines in Fig. 18) after the control lever 159 is moved to and latched in the set position shown in Fig. 17. When the cam is thus stalled it is unclutched from the drum, held locked in its stalled position, and finally unlocked and re-clutched to the drum, the re-clutching action resulting in the cam being again clutched to the drum after a single revolution of the drum and with the cam in the same normal relation to the drum which it had at the time the stalling occurred. The single revolution or 360 degree turn of the drum relatively to the stalled or stopped cam is effective, as hereinafter described, to bring about the unlocking and ejection of a used master sheet and the introduction and locking of a new master sheet.

Means coactive with plungers 184 to introduce one end of a master sheet into the drum slot 182 for locking of said sheet to the drum by the pins 183 will next be described. A master sheet feed table 202 having longitudinal side flanges, has its flanges pivoted on tie rod 13 near the discharge end of the table. A master sheet deflector plate 203 extends between the side flanges of the feed table 202 and is pinned to rod 13 with said plate inclined upward and rearward opposite the upper rear portion of the drum. Table 202 is adapted to be swung about rod 13 from a horizontal inoperative position in which the table overlies the drum and rests on tie rod 14 to an operative feeding position of the table shown in the drawings. In feeding position the table extends upward and rearward from a point adjacent the upper rear portion of the drum, being supported in this position by pivot rod 13 and by a stop or supporting bar 204 held to the frame side walls. Deflector plate 203 is slightly above the inclined bottom of the table when the table is in feeding position.

Interposed between the drum and the discharge end of table 202 with their bight substantially in the plane of the bottom of table is a pair of normally inactive feed rollers 205 and 206. Roller 205 is a hollow metal roller or sleeve having a knurled periphery and mounted on a rock shaft 207 for rotation on said shaft. Rock shaft 207 extends through the frame walls and is journalled in bearings on said walls, the shaft extending parallel to the drum below the lower end of the feed table and supporting roller 205 out of contact with the drum. Fixed to the ends of rock shaft 207 is a pair of forwardly and upwardly extending rock arms 208 having short longitudinal closed slots 209 therein in which are slidably held a pair of bearing blocks 210 slidably shiftable longitudinally of the rock arms 208.

Roller 206 is a rubber faced roller having reduced or shaft end portions journalled in bearing blocks 210 to permit said roller to normally gravitate into contact with the upper front portion of roller 205. A spring 211, connected to wall 11 and to a rearwardly extending rock arm 212 fixed to shaft 207, normally holds arms 208 rocked upward in the position shown in Figs. 16 and 19 to normally hold roller 206 out of contact with the drum. The frame side walls have clearance apertures 213 for the reduced or shaft end portions of roller 206 arranged to permit swinging of said roller into contact with the drum and also to limit swinging movement of the roller away from the drum.

Means associated with cam 165 whereby roller 206 may be yieldingly pressed to the drum against the resistance of spring 211 to cause driving of said roller by the tractive effect of the drum thereon and cause the driving of roller 205 by the tractive effect thereon of roller 206, to thereby effect activation of the pair of rollers 205—206 to feed a master sheet from table 202 to the drum, will now be described. Loosely pivoted on rock shaft 207 between frame side wall 11 and the left hand end of roller 205 is a rigid metal rock arm 214 which depends from said shaft and has journalled thereon near its lower end on a horizontal pivot a roller cam follower 215 extending inward or toward the right from said rock arm. Pendent from the rock shaft 207 is a resilient fore-and-aft flexible spring metal rock arm 216 the upper end of which is fixed to shaft 207 and the lower end of which is engaged in a slot 217 in a lug 218 formed on the lower end of rock arm 214, which slot extends transversely of the machine. The interlocked rock arms 214 and 216 form, in effect, a resilient fore-and-aft flexible rock arm supporting the follower 215.

Follower 215 is coactive with the outer edge portions 226 and 227 of a pivoted and normally inactive cam arm 220, as hereinafter described. Cam arm 220 is pivotally held at its leading end to the left hand head of drum 20 externally of the drum by a horizontal pivot 221 and carries adjacent its free trailing end on a horizontal pivot a roller cam follower 222 which extends outwardly or toward the left from cam arm 220 and is coactive with the periphery of cam 165 as hereinafter described. Cam arm or swinging cam 220 is provided adjacent is trailing end with a short closed arcuate slot 223 through which extends the shank of a headed guide and stop screw or screw stud 224 held to the left hand head of drum 20 to limit swinging of arm 220, slot 223 being concentric with the pivotal axis of arm 220. A spring 225 connected to the trailing end of arm 220 and to the left hand head of the drum normally yieldingly holds arm 220 rocked inward toward the drum axis to or substantially to, the possible limit of inward swinging movement of arm 220 in which normally held inactive position of arm 220 the follower 222 is engaged (as shown in Figs. 16, 17 and 19) against the low edge portion 186 of cam 165.

During rotation of the drum 20 with cam 165 held stalled, the high edge portion 185 of cam 165 is effective on follower 222 to swing cam arm 220 outward to, or substantially to, the outer limit of its swinging movement into the active position shown most clearly in Figs. 10 and 14. Arm 220 is formed at its outer edge with a straight active leading edge portion 226 and an arcuate inactive or dwell edge portion 227 for coaction with follower 215 on arm 214. When arm 220 is forced outward from its inactive position to its active position, the dwell edge portion 227 is concentric with the drum axis, and the active portion 226 then slopes inward from the leading end of the dwell portion toward the leading pivoted end of arm 220.

Pins 183 reciprocate in cylindrical guide bores 228 in the drum, and plungers 184 reciprocate in cylindrical guide bores 229 in the drum. For convenience in manufacture, these bores and slot 182 are formed in a metal bar 20ª which forms a removable part of the cylindrical wall of the drum and is detachably held by bolts 230 to lugs 231 formed on the drum heads. Slot 182 extends across bores 228 near the trailing ends of said bores, and said slot extends across the trailing halves of bores 229. The extensions 184ª of plungers 184 have flat leading faces lying in a plane parallel with and about half way between the planes of the leading and trailing walls of the drum slot 182.

The operation of the machine, which will be obvious to those skilled in the art, is generally as follows:

Assuming no master sheet is attached to the drum, the operator places a prepared master sheet M on the master sheet feed table 202, with the inked face of the sheet facing toward the front of the machine and with the top marginal edge of the sheet lowermost, and allows the sheet to slide downward between the table and deflector plate 203 until it is stopped and registered by engagement with the contacted feed rolls 205 and 206 at the bight of said rolls. Lever 159 is then set by the operator who thereupon starts to turn the operating crank handle clockwise as the machine is viewed in Fig. 1, and may continue to so rotate the handle during making of copies from master sheet M and from the other master sheets subsequently successively fed at will from table 202.

When the rotation of the handle is started cam 165 will rotate in unison with the drum until part 201 on the cam engages under the lower end of the set lever 159 and thereby stalls or stops rotation of cam 165 at a point in which the cam and drum are rotated into the position shown in Fig. 16. The drum will next make one complete revolution while the cam is stationary, and thereafter the drum and cam 165 will again rotate in unison and continue to so rotate during turning of the handle unless lever 159 is again set.

During the described single revolution of the drum relatively to cam 165, the follower 187 is carried once around the periphery of the cam. As this follower travels around the cam, pins 183 are retracted and plungers 184 are projected shortly after drum slot 182 passes platen roller 32 (see Fig. 18). Shortly thereafter, and before the parts reach the position shown in Fig. 14, the cam 220 will be swung fully outward by the action of cam 165 on follower 222. In the construction shown, cam 220 is first swung partly outward by the action thereon of wrist 188 carrying follower 187 (as shown in Fig. 18), but such preliminary swinging of cam 220 is not essential. Shortly before the drum arrives at the position shown in Fig. 14, the outwardly swung cam 220 acts on follower 215 to yieldingly force feed roll 206 against the periphery of the drum whereupon rolls 205 and 206 start rotating and feed master sheet M toward the drum.

It will be seen from Fig. 14 that the leading edge of the master sheet advances obliquely downward and forward behind and toward the drum to meet the then upwardly and forwardly advancing mouth of drum slot 182 and that said sheet edge and slot mouth meet below that plane radial to the drum in which lies the drum axis and the bight of the master sheet feeding rolls 205 and 206. As the leading edge of the master sheet M reaches the drum (as shown in Fig. 14) the extensions 184a of plungers 184 engage behind the sheet and start to carry the leading end of said sheet along with the drum with the leading edge of the sheet registered with the mouth of the slot by said extensions. As the drum passes beyond the position shown in Fig. 14, follower 187 moves onto the low edge 186 of cam 165 and the plungers 184 are quickly retracted and simultaneously, the pins 183 are quickly projected, these movements of the plungers and pins being completed substantially at the time the mouth of the slot arrives in the aforesaid plane in which lies the drum axis and the bight of feed rolls 205 and 206. The retracting plungers permit the leading end of the master sheet to move down into the slot 182 and guide its leading end into the slot, the rotative advancing movement of the slot and plungers about the drum axis combined with the feeding action of the rolls 205 and 206 insuring carrying of the leading portion of the master sheet to, or substantially to, the bottom of the slot and pinning of said portion to the drum by pins 183 without liability of retraction of the sheet from the slot prior to the pinning of the sheet. As the said revolution of the drum relatively to cam 165 continues, the master sheet M will be withdrawn from the table 202 (see Figs. 16 and 17) and will thereafter be carried around and around the drum axis until lever 159 is again set, feed roll 206 returning to normal position out of contact with the drum when the drum reaches a point in said revolution midway the drum positions shown in Figs. 14 and 16 by reason of follower 222 moving from the high edge 185 of cam 165 onto the low edge 186 of said cam.

During the first portion of this revolution of the drum relatively to stalled cam 165, the clutch 178—179 opens and forces the stalled cam 165 axially toward the left. The clutch 178—179 is closed in Figs. 13 and 20 and is open in Figs. 7, 8, 9, 10 and 11. As cam 165 is forced axially toward the left from the vertical fore-and-aft plane in which it is shown in Figs. 13 and 20, it presses stud 181 on spring latch 164 to the left, thereby flexing said spring latch and releasing the set lever 159. Lever 159, when set, stalls the cam 165 in the rotated position shown most clearly in Figs. 7 to 10, 14, 16 and 18, the lever being shown set in Figs. 13 and 17. In the stalled position of cam 165, projections 176 and 177 are engageable, as shown most clearly in Fig. 7, to lock or hold the cam stalled against rotation after the automatic release of lever 159 until the single revolution of the drum relatively to the stalled cam is completed. At the end of this revolution spring 180 forces cam 165 toward the right and closes the clutch 178—179 and holds it closed. The unclutching and locking of cam 165 and the release of the set control lever 159 occur before the drum has turned relatively to the stalled cam 165 into the position shown in Fig. 18. The cam is re-clutched to the drum at the time the drum has rotated one revolution relatively to the stalled cam into the position shown in Fig. 16.

Copy sheet feed roll 53 is raised and lowered once for each revolution of the drum, and the copy sheet registering stops 113 are rocked into and out of effective position once for each revolution of the drum, the stops being moved to effective position as the roll 53 is raised and being moved to ineffective position as the roll is lowered. The movements of roll 53 and stops 113 are controlled by cam 125 and its follower 124. Shortly before the drum arrives at that point in its revolution in unison with cam 165 shown in Fig. 16, and at which the cam is also adapted to be stalled by lever 159 when the latter is set, the follower 124 moves from the high edge 126 of cam 125 onto the leading part of the low edge portion 127 of cam 125 thereby causing lowering of the roll 53 for tractive driving of said roll from roll 54 and also causing moving of the stops 113 to ineffective position.

The length of the low portion of cam 125 is such that roll 53 is held lowered and stops 113 are held ineffective throughout about one-quarter of each revolution of the drum. At any time while the roll 53 is raised and stops 113 are in their effective position, that is, at any time during approximately three-quarters of each revolution of drum 20, a clear copy sheet may be positioned for feeding. During this portion of the above-described revolution of drum 20 relatively to stalled cam 165 and prior to the lowering of roll 53 and movement of stops 113 to ineffective position near the end of said drum revolution, the first clear sheet or copy sheet C is placed upon the feed table and slid rearward between the separated feed rolls 53 and 54 against the forward ends of the combined stops and registering members 113, as shown in dotted lines in Fig. 14. As the drum completes this revolution relatively to cam 165 and shortly prior to the drum's completing its movement from the position shown in Fig. 14 to that shown in Fig. 16, the roll 53 lowers, the stops 113 move to ineffective position, and the copy sheet C is fed rearward by rolls 53 and 54 under stops 113 and depresses the feeler or copy sheet detector fingers 152, thereby positioning thrust link 147 for upward movement by the reduced end 154a of lug 154 on lever 121 to actuate the counter 143 when lever 121 is thereafter rocked to again lift roll 53 and render stops 113 again effective. The roll 53 is lifted and stops 113 are rendered effective shortly prior to the time the drum is rotated into the position shown in Fig. 17, in which position copy sheet C has already been gripped between, and fed a short distance through the bight of, the drum 20 and the platen roller 32 which coact to press the copy sheet to the master sheet and to complete feeding and discharge of the copy sheet. If desired a pan or tray 232 (Fig. 2) may be seated on the bottom wall 12 of the frame to receive discharged sheets.

During each succeeding revolution of the drum following that which it makes relatively to cam 165 while the cam is stalled, and during the portion of each such revolution corresponding to that in which the first copy sheet was introduced, a clear copy sheet is similarly introduced for automatic timed feeding thereof through the machine. A copy sheet such as C' may be introduced during this interval between the feed rolls 53 and 54 and registered and held against feeding by stops 113 while the preceding copy sheet is being fed through the machine with a trailing part thereof still resting on feed table 48, as shown in Fig. 19, since the forward ends of stops 113 will be, under such conditions, yieldingly pressed down on top of sheet C in position to hold sheet C' against being drawn along with sheet C which is at such time being fed by rolls 55 and 56 and by the drum 20 and platen roller 32.

Shortly before each fed clear sheet reaches the bight of rolls 55 and 56 roll 55 is lifted for a brief period and again lowered to roll 56 for the purpose hereinbefore described and by reason of the action of member 142 on member 140, roll 55 being shown in full lines in elevated position in Fig. 16. As the clear sheet passes between rolls 55 and 56, the upper face of said sheet is dampened or moistened uniformly with an extremely fine or infinitesimal film of volatile ink solvent transferred thereto by roll 55. The dampened sheet then travels between the platen roll 32 and drum 20 which press the dampened face of the clear sheet to the inked face of the master sheet to produce a printed copy.

It will be obvious from the foregoing description of the operation of the machine that the operator may, before completing the taking of the desired number of copies from the master sheet M, place a second master sheet M' upon the feed table 202 ready to be fed into the machine, as shown in Fig. 19. The old master M may be discharged and the new master M' fed into the machine at the will of the operator without any interruption of the making of a copy for each revolution of the drum. To effect such change of master the operator merely has to, while continuing the drum rotation and the timed manual introduction of clear sheets, set the control lever 159 during the feed of the last clear sheet but one of the number of copies desired to be made from the old master. During the feeding and printing of the next clear sheet, that is, the last one of the clear sheets upon which it is desired to take a copy from the old master sheet M, said last copy or clear sheet will be printed from, and discharged together with, the old master M as shown in Fig. 18, and the new master M' will be fed into the machine and locked to the drum and will print the next clear sheet.

The connection 264—265 between each arm 263 and the adjacent arm 63 permits a small amount of lost motion making provision for accurate feeding of sheets of different thickness and for lifting of roll 53 to inactive position by means of arms 63, shaft 64, arm 67, roller 68 and cam-actuated lever 121.

The modified machine of Figs. 23, 24 and 25 is constructed as in the case of the machine shown in Figs. 1 to 22 and above described, except for the addition to the above-described machine of a link 266, a lever 267 and a groove or recess 268 formed in the inner face of that one of the arms 137 which is located at the right-hand side of the machine.

The lever 267 is mounted about midway its ends on a suitable horizontal pivot 269 held to the right-hand side plate 10 of the machine at the level of and in rear of rock shaft 150. Link 266 is pivotally connected to rock arm 149 and to one arm of lever 267 for parallel motion of said lever arm and rock arm. The spring 153, which acts on rock arm 149 to normally urge the latter into a position in which it depends vertically from rock shaft 149 (as described in connection with the machine illustrated in Figs. 1 and 2) acts, in the modified machine, on lever 267 through link 266 to normally likewise urge lever 267 into vertical position parallel to rock arm 149, as shown in Figs. 23 and 24. Lever 267 is supported on pivot 269 to swing fore-and-aft of the machine in the same fore-and-aft plane of the machine in which groove or recess 268 lies; the upper end of the lever 267 being receivable in recess 268 in the lowered position of the recessed arm 137 and roller 55, as shown in Fig. 25, when the copy sheet is being fed. Pivot 269 is so positioned fore-and-aft of the machine, and the length of the upper arm of lever 267 is such, that, in the vertical position of lever 267 its upper end is engageable under recessed arm 137 forward of the forward edge of recess 268 (as shown in Fig. 23) to prevent lowering of roll 55 from its highest elevated position to its lowered position (shown in Fig. 25) in which it contacts roll 56.

It will be obvious, therefore, that if the drum 20 is rotated without feeding of copy sheets, moisture applying roll 55 will shift at each revolution between the positions thereof shown in Figs. 23 and 24 and moistening of roll 56 will be prevented during such idle operation of the machine. However, when a copy sheet is fed into the machine by rolls 53 and 54, the leading edge of said sheet will arrive at fingers 152 as lever arm 137 starts upward from the position of Fig. 23 (see Fig. 24) and will (see Fig. 25) push said fingers 152 rearward to permit full lowering of roll 55 just before the copy sheet enters the bight of rolls 55 and 56, thereby permitting moistening of the sheet by roll 55. If no copy sheet is fed against fingers 152 during movement of roll 55 to the position of Fig. 24 and back to that of Fig. 23, and the machine is stopped, roll 55 will be held against lowering into contact with roll 56 by the lever 267, as shown in Fig. 23, while the machine remains idle.

What I claim is:

1. In a machine of the character described, the combination of a rotatable master sheet carrier, drive means for continuously rotatively driving said carrier through repeated revolutions, means controlled by rotary movement of the carrier to operate during each revolution of the carrier in timed relation with the carrier to moisten one face of a copy sheet supplied to said means and press the moistened face of said copy sheet to a master sheet carried by the rotating carrier, a control member normally urged to an idle position and manually settable at will in an active set position, means for automatically latching said control member in set position, and means controlled by the setting of said member and operable by continued rotation of the carrier to effect a substitution of a new master sheet for one carried by the carrier without interruption in the making of a copy for each revolution of the drum and to unlatch the set control member to prevent an automatic repeat of master sheet substituting operation of said means.

2. In a machine of the character described, the combination of a rotatable master-sheet-carrying drum, drive means for continuously rotatively driving said drum through successive revolutions, a platen roller in constant sheet pressing relation with said drum, copy sheet feeding and moistening means, means controlled by rotary movement of said drum to operate during each successive revolution of the drum to moisten a copy sheet supplied to said means and feed it into the bight of the drum and platen roller in timed relation with the drum for the pressing together of the moistened copy sheet and a master sheet carried by the drum, means operable by a single revolution of the drum to effect the release and discharge of a master sheet carried by the drum and the attachment of a new master sheet to the drum, and an automatically restored control member manually settable during any desired revolution of the drum to render said last-mentioned means effective at the end of that revolution for the next ensuing revolution only of the drum.

3. In a machine of the character described, the combination of a rotatable master-sheet-carrying drum, drive means for continuously rotating the drum through successive revolutions, a platen roller in constant sheet pressing relation with said drum, copy sheet feeding and moistening means controlled by rotary movement of the drum to operate during each revolution of the drum to moisten one face of a copy sheet supplied to said means and feed said sheet into the bight of the drum and platen roller in timed relation with the drum for pressing of the moistened face of the fed copy sheet to the inked outer face of a master sheet carried by the drum, a manually settable master sheet change control member normally urged into an inactive position, means for latching said control member in set position, and means controlled by setting of said member for operation of said means by rotation of the drum during a single drum revolution to discharge a used master from the drum, attach a new master to the drum, and unlatch member.

4. In a machine of the character described, the combination of a rotatable duplicating drum having a longitudinal slot extending radially thereinto from the drum periphery, means for rotatively driving the drum, a platen roller opposed to the drum for sheet pressing coaction therewith, a master sheet feed table supported independently of the drum, master sheet locking pins carried by the drum for reciprocation into and out of a locking position in which they are projected across the slot for extension through an end portion of a master sheet engaged in the slot, means for introducing one end portion of a master sheet on said master sheet feed table into said slot for locking of said sheet to said drum by said pins, means for effecting actuation of said pins to unlocking position and back to locking position and sheet introducing actuation of said master sheet introducing means while the pins are in unlocked position during travel of the slot from the platen roller to the master sheet feed table, and manually shiftable control means for rendering said means for effecting said actuation of the pins and master sheet introducing means effective at will.

5. In a machine of the character described, the combination of a rotatable duplicating drum having a longitudinal slot extending radially thereinto from the drum periphery, means for rotatively driving the drum, a platen roller opposed to the drum for sheet pressing coaction therewith, a master sheet feed table supported independently of the drum, master sheet locking pins carried by the drum for reciprocation into and out of a locking position in which they are projected across the slot for extension through an end portion of a master sheet engaged in the slot, means for introducing one end portion of a master sheet on said master sheet feed table into said slot for locking of said sheet to said drum by said pins, means for effecting actuation of said pins to unlocking position and back to locking position and sheet introducing actuation of said master sheet introducing means while the pins are in unlocked position during travel of the slot from the platen roller to the master sheet feed table, manually shiftable control means for rendering said means for effecting said actuation of the pins and master sheet introducing means effective at will, a copy sheet feed table supported independently of the drum, and means operating in timed relation to the drum for advancing a copy sheet from the copy sheet feed table into the bight of the drum and platen roller for travel of said sheet between the drum and roller together with a master sheet locked to the drum, said last mentioned means including means for applying an ink solvent to the advancing copy sheet in advance of the platen roller on that face of the copy sheet which is presented toward the drum when said sheet passes between the drum and platen roller.

6. In a machine of the character described, the combination of a rotatably supported master sheet carrying cylinder having a narrow longitudinal slot in its periphery for receiving an end portion of a master sheet, means for rotatively driving said cylinder continuously through successive revolutions, a feed roller mechanism for feeding a master sheet toward the cylinder, means carried by the cylinder for guiding a master sheet edgewise into said slot and for ejecting it from the slot, means carried by the cylinder for locking a master sheet in said slot, normally inactive means operable by rotation of the cylinder during a single revolution of the cylinder to actuate the feed roller mechanism and the cylinder carried means to unlock and discharge a used master and to feed and lock to the cylinder a new master, and manual control means for rendering said normally inactive means effective at will.

7. In a machine of the class described, the combination of a rotatably mounted duplicating drum having in its periphery a longitudinal slot to receive an end portion of a master sheet, a pair of normally stationary and abutting master sheet feed rolls extending longitudinally of the drum, and supported for swinging one of said rolls about the axis of the other into driving contact with the drum or a master sheet on the drum to drive the rolls, means for swinging said one roll, means carried by the drum and projectible outward therefrom to register with said slot the leading edge of a master sheet being fed by said rolls and retractible into the drum to lead said sheet edge down into the slot, and means carried by the drum for locking the master sheet in the slot.

8. In a machine of the class described, the combination of a rotatably mounted duplicating drum having in its periphery a longitudinal slot to receive an end portion of a master sheet, a pair of normally stationary and abutting master sheet feed rolls extending longitudinally of the drum, and supported for swinging of one of said rolls about the axis of the other into driving contact with the drum or a master sheet on the drum to drive the rolls, means for swinging said one roll, means carried by the drum and projectible outward therefrom to register with said slot the leading edge of a master sheet being fed by said rolls and retractible into the drum to lead said sheet edge down into the slot, means carried by the drum for locking the master sheet in the slot, and means manually conditioned at will for actuating the roll swinging means and the drum carried means to effect a change of master sheets.

9. In a machine of the class described, the combination of a rotatably mounted duplicating drum having in its periphery a longitudinal slot to receive an end portion of a master sheet, a pair of normally stationary and abutting master sheet feed rolls extending longitudinally of the drum and supported for swinging of one of said rolls about the axis of the other into driving contact with the drum or a master sheet on the drum to drive the rolls, means for swinging said one roll, means carried by the drum and projectible outward therefrom to register with said slot the leading edge of a master sheet being fed by said rolls and retractible into the drum to lead said sheet edge down into the slot, means carried by the drum for locking the master sheet in the slot, a manually settable control member, and means operable by rotary movement of the drum when said member is set to effect a change of master sheets and unset said control member.

10. In a machine of the character described, the combination of a frame, a duplicating drum rotatably mounted in the frame for turning about a horizontal axis extending transversely of the frame, drum driving means for continuously rotating the drum through successive revolutions, a platen roller extending longitudinally of and engaged under the drum and rotatably journalled in the frame, said drum having a narrow longitudinal slot extending inward from its periphery for receiving edgewise therein an end portion of a master sheet, copy sheet feeding and moistening means for feeding a copy sheet rearward into the bight of the drum and platen roller and moistening the upper face of the copy sheet as it is fed to said bight, said sheet feeding and moistening means being operatively connected with the drum for operation during each revolution of the drum to feed one copy sheet to the drum to pass between the drum and platen roller concurrently with a master sheet held to the drum, locking means carried by the drum for releasably holding the leading end portion of a master sheet locked in the drum slot, and means manually conditionable at will for operation thereof by rotation of the drum to effect unlocking of said locking means, ejection of the leading end of an unlocked master sheet from said slot, edgewise introduction into the slot of an end portion of a new master, and re-locking of said locking means during travel of the slot from and back to the platen roller.

11. In a machine of the character described, the combination of a frame, a duplicating drum extending transversely of and rotatably supported in the frame, drum driving means for rotating the drum in a direction in which the drum periphery moves upward behind the drum axis, a platen roller extending transversely of and rotatably mounted in the frame and engaged under the drum, copy sheet feeding and moistening means forward of the engaged drum and platen roller and operating in timed relation to the drum to deliver rearwardly into the bight of the drum and platen roller, and approximately concurrently with the arrival of the leading end of a master sheet at said bight, a copy sheet moistened on its upper face, said drum having a longitudinal slot in its periphery to receive the leading end of a master sheet fed to the drum, normally effective locking means carried by the drum for releasably locking a master sheet end in said slot, normally ineffective means for feeding a master sheet downwardly behind the drum as the slot travels upwardly about the drum axis behind said axis, and means manually settable to temporarily release said locking means during travel of the slot away from the platen roller toward a point above the drum axis and to, during the period of release of said locking means, first eject from the slot the unlocked end of a master sheet engaged in said slot and render said master sheet feeding means temporarily effective and coact with the sheet being fed thereby to introduce said sheet into the drum slot.

12. In a machine of the class described, the combination of a rotatable duplicating drum having a longitudinal slot in its periphery for reception of the end portion of a master sheet, a pair of opposed feed rolls extending longitudinally of the drum and operable at will to feed a master sheet toward said drum from the bight of the rolls as the mouth of the slot approaches the plane in which lies the said bight and the drum axis, and means carried by the drum and rendered automatically operative during feeding action of said feed rolls to engage and register the leading end of a master sheet being fed by said rolls with said drum slot and flex the said end of said sheet toward the mouth of said drum slot and lead it into said drum slot as the slot approaches said plane, and master sheet locking means carried by the drum operative automatically to first release a held master sheet and then lock the newly fed master sheet to the drum upon actuation of the first-mentioned means.

13. In a machine of the class described, the combination of a rotatably mounted duplicating drum having a narrow longitudinal slot extending inward from its periphery in a plane radial to the drum axis, means for rotatively driving said drum in one direction, means for projecting a leading portion of a master sheet toward the slot mouth, drum carried means for flexing the projected portion of the master sheet toward the slot mouth and directing it into the slot as the drum rotates, and means for locking said end portion of the master sheet in the slot following insertion thereof in the slot.

14. A duplicating machine of the character described having, in combination, a frame, a duplicating drum journalled in the frame and having a narrow longitudinal slot extending inward from its periphery substantially radially of the drum axis, means for rotatively driving the drum continuously through successive revolutions, and means on the drum and frame manually conditionable at will for actuation thereof by rotation of the drum to feed an end portion of a master sheet edgewise into said radial slot while the drum is rotating and to lock the fed in end portion of said sheet in said radial slot.

15. A duplicating machine, as claimed in claim 14, wherein the fed in end portion of the master sheet is locked to the drum by master sheet perforating locking pins reciprocably carried by the drum for reciprocation across the slot through the fed in end portion of the master sheet and through both those walls of the slot which are disposed substantially radially of the drum axis.

16. A duplicating machine as claimed in claim 14, having means to feed and press a copy sheet to the drum during each revolution of the drum, and wherein said means on the drum and frame are manually conditionable for actuation by drum rotation during a single revolution of the drum to first unlock a master sheet held to the drum and eject its held end portion from said drum slot as a copy is being made from said master sheet and to thereafter feed edgewise into and lock in said slot an end portion of a new master sheet in time for printing of the next fed copy sheet from the new master sheet.

17. A duplicating machine of the character described, comprising a rotatably supported duplicating drum having a narrow longitudinal slot extending inward from its periphery substantially radially to the drum axis, means for rotatively driving the drum continuously through successive revolutions, means manually conditionable at will for actuation thereof by rotation of the drum to first eject from the slot an end portion of a used master sheet and then introduce edgewise into the slot an end portion of a fresh master sheet during a predetermined part of a single revolution of the drum and while the drum is rotating, and normally effective means for locking to the drum the master sheet end portion engaged in the slot and operable automatically in conjunction with the manually conditionable means to first release the locked end portion of the used master sheet for ejection from the slot and to thereafter lock in the slot the newly introduced end portion of the fresh master sheet.

18. A duplicating machine, as claimed in claim 17, having means for moistening one face of a copy sheet and for feeding said sheet past the drum with its moistened face pressed toward the drum at a point which is reached substantially concurrently by the leading end of the copy sheet and the locked end of a master sheet held to the drum, which point is in advance of the point in the revolution of the drum at which the unlocking and ejection of the held end of a master occurs.

19. A duplicating machine of the character described having, in combination, a rotatable duplicating drum having a longitudinal slot extending inward from its periphery to receive therein an end portion of a master sheet, reciprocable pins carried by the drum for projection across said slot through both inwardly extending side walls of said slot to perforate and lock to the drum the end portion of a master sheet engaged in the slot and for retraction from across said slot to unlock such end portion of a master sheet, and means for at will reciprocating said pins from and back to locking position.

20. A duplicating machine, as claimed in claim 19, wherein the pin reciprocating means include a manually settable control member and are operable automatically through a single cycle by revolution of the drum upon setting of the manual control element of said means.

21. A duplicating machine of the character described having, in combination, a rotatable duplicating drum having a narrow longitudinal slot extending radially inward from the drum periphery, means for rotatively driving said drum in one direction, a normally inactive pair of feed rollers coactive with said drum when rendered active to project a master sheet to meet the mouth of said slot during rotation of the drum at a point before the slot mouth reaches the radial plane in which lies the drum axis and the bight of the pair of feed rollers, normally inactive drum carried means reciprocable radially of the drum through said slot, and means for at will rendering said feed rollers and said drum carried means conjointly active to introduce an end portion of a master sheet into said slot during rotation of the drum, said drum carried means, when active, being projectible outwardly of the drum to catch the projected end of a master sheet fed toward the slot mouth by the feed rollers and flex said sheet end into the slot mouth during rotation of the drum and feeding of the sheet by the rollers.

22. A duplicating machine of the character described having, in combination, a rotatable duplicating drum having a narrow longitudinal slot extending radially inward from the drum periphery, means for rotatively driving said drum in one direction, a normally inactive pair of feed rollers coactive with said drum when rendered active to project a master sheet to meet the mouth of said slot during rotation of the drum at a point before the slot mouth reaches the radial plane in which lies the drum axis and the bight of the pair of feed rollers, normally inactive drum carried means reciprocable radially of the drum through said slot, means for at will rendering said feed rollers and said drum carried means conjointly active to introduce an end portion of a master sheet into said slot during rotation of the drum, said drum carried means, when active, being projectible outwardly of the drum to catch the projected end of a master sheet fed toward the slot mouth by the feed rollers and flex said sheet end into the slot mouth during rotation of the drum and feeding of the sheet by the rollers, and means controlled by said means for rendering the feed rollers and drum carrying means effective, for automatically and positively locking the received end of the master sheet in said drum slot approximately as said slot arrives in the aforesaid radial plane.

23. In a duplicating machine having a rotatable form carrier and means for rotatively driving said carrier and feeding and pressing copy sheets to a form carried thereby, a cam normally rotatable with said carrier about the axis of rotation of the carrier, means for at will holding said cam against rotation with the carrier during a single revolution of said carrier, and means controlled by said cam during rotation of said drum relatively to said cam while the came is held stationary to effect an exchange of the form previously carried by the carrier for another form.

24. A duplicating machine having a rotatable master sheet carrying and backing drum provided with a longitudinal slot extending inward from the drum periphery for receiving an end of a master sheet, means for locking the received end of a master sheet in said slot, a cam normally rotatable with said drum about the drum axis, means for at will holding said cam against rotation while the drum rotates through a single revolution relatively to the cam, and means controlled by such a revolution of the drum relatively to the cam to effect an exchange of another master sheet for one carried by the drum, and means for feeding and moistening and pressing a different copy sheet to the drum carried master sheet upon each revolution of the drum.

25. A duplicating machine of the character described having, in combination, a frame, a master sheet holding cylinder journalled in the frame, a cam normally rotatable in unison with said cylinder, means manually settable at will to stall said cam at a predetermined point in its rotary movement about the cylinder axis while the cylinder makes a single revolution only relatively to the cam, and means on the frame and cylinder controllable by said cam during such a revolution of the cylinder relatively to the cam to release a held master sheet from said cylinder and substitute therefor in held relation to said cylinder another master sheet.

26. A duplicating machine of the character described having, in combination, a frame, a master sheet holding cylinder journalled in the frame, a cam normally rotatable in unison with said cylinder, means manually settable at will to stall said cam at a predetermined point in its rotary movement about the cylinder axis while the cylinder makes a single revolution only relatively to the cam, and means controllable by said cam during such a revolution of the cylinder relatively to the cam to effect an exchange of a new master sheet for a master sheet held to the cylinder, and means operable in timed relation to the rotating cylinder to moisten and then press a copy sheet to the master sheet held to said cylinder.

27. A duplicating machine having, in combination, a rotatable form carrier, means for rotatively driving said carrier, means for feeding and moistening and pressing copy sheets to a form carried by said carrier and counting only the sheets actually fed and moistened and pressed, a cam normally held to the carrier to rotate in unison therewith about the axis of rotation of the carrier, means manually settable at will to effect a stalling of said cam at a predetermined point in the rotation of the carrier about its axis and throughout a single revolution only of the carrier relatively to the stalled cam, and means controlled by such a revolution of the carrier relatively to the stalled cam to effect an exchange of another form for one carried by the carrier at the time of stalling of said cam.

28. A duplicating machine of the character described, comprising a master sheet carrying cylinder rotative about a horizontal axis, a platen roller under said cylinder and coactive with said cylinder to feed copy sheets through the bight of said cylinder and platen roller in face contact with a master sheet carried by the cylinder, means for rotatively driving the cylinder and platen roller to feed copy sheets through the bight thereof, introductory feed means for feeding copy sheets generally horizontally into the bight of the cylinder and platen roller for feeding of said copy sheets through said bight by the rotatively driven cylinder and platen roller, means operating in timed relation to said cylinder for rendering said introductory feeding means functionally operative during a part of each revolution of the cylinder, stop and registering means operable in timed relation to said cylinder to permit introduction of a copy sheet into said introductory feeding means and registering of said sheet while the introductory feeding means is functionally inoperative, and movable down on any copy sheet being fed past said stop and registering means by said cylinder and roller, while the introductory feed means is functionally inoperative, to stop and register a copy sheet introduced into the introductory feed means on top of the sheet being fed by the cylinder and roller.

29. A duplicating machine of the character described comprising a frame, a master sheet carrying cylinder supported in the frame for rotation about a horizontal axis extending transversely of the machine, a platen roller rotatably supported in the frame to extend transversely of the machine under and in sheet pressing relation to the master sheet carrying cylinder, a pair of superposed introductory feed rolls for copy sheets extending transversely of the machine forward of the cylinder and platen roller, a pair of superposed rolls extending transversely of the machine behind the introductory feed rolls forward of the superposed cylinder and platen roller, means for positively driving the cylinder in a direction for coaction thereof with the platen roller to feed a copy sheet rearward between said cylinder and platen roller, means for positively driving in unison with the cylinder the lower introductory feed roll and the lower one of the pair of superposed rolls located behind the introductory feed rolls, means responsive to revolution of the cylinder to lower the upper introductory feed roll into sheet feeding relation with the lower introductory feed roll for a predetermined part of each revolution of the cylinder, means responsive to revolution of the cylinder to lift the upper one of the pair of rolls behind the introductory feed rolls from and lower it back into contact with the lower one of said pair of rolls during advance of the leading end of a copy sheet by the introductory rolls to said pair of rolls, and means responsive to revolution of the cylinder to continuously rotate during revolution of the cylinder the upper one of the rolls located behind the introductory rolls and apply an ink solvent to said roll during rotation thereof for transfer by said roll to the upper faces of copy sheets fed through the machine.

30. A duplicating machine, as claimed in claim 29, having copy sheet stopping and registering means located above the path of feed of copy sheets from the bight of the introductory feed rolls to the bight of the pair of rolls therebehind; and means responsive to revolution of the cylinder to hold said stopping and registering means in ineffective position while the upper introductory feed roll is lowered and to yieldingly urge said means down into effective position while the upper introductory feed roll is lifted, said stopping and registering means in the effective position thereof being positioned to stop and register the leading end of a copy sheet at a point in rear of the point of contact of the introductory feed rolls upon manual insertion of a copy sheet between the introductory rolls while the upper one of said rolls is lifted.

31. A duplicating machine, as claimed in claim 29, having a copy sheet counter, means operable by each revolution of the cylinder to actuate the counter, and means normally operative to disable the counter actuating means and operable by a copy sheet, as the latter is fed toward the cylinder and platen roller by the introductory feed rolls, to render the counter actuating means operative to actuate the counter.

32. A duplicating machine of the character described comprising a master sheet carrying cylinder, means for driving the cylinder, means for feeding copy sheets to said cylinder in timed relation to said cylinder for pressing of the copy sheets to a master sheet carried by the cylinder, and for moistening the copy sheet as it travels to the cylinder and on that face of the copy sheet which is pressed to the cylinder carried master sheet, means for pressing a fed copy sheet to a master sheet carried by the cylinder, a copy sheet counter, counter actuating means operatively connectible to said feeding means for actuation by the latter, and means for normally interrupting the operative connection of the counter actuating means with said feeding means and operative by a copy sheet being fed by said feeding means to operatively connect the counter actuating means with said feed means.

33. A duplicating machine of the character described comprising a rotatively driven duplicating drum, a platen roller coactive with the drum, means for feeding copy sheets to the coactive drum and platen roller and moistening said sheets in transit, a cam held to rotate in unison with the drum, a lever rockable by said cam and associated with said copy sheet feeding and moistening means to time the start of feed of each copy sheet, a copy sheet counter, and means, controlled by a copy sheet being fed to the coactive drum and platen roller, for connecting said counter to said lever for actuation of the counter by the lever to count the sheet being fed.

34. A duplicating machine of the wet process type comprising, a rotatable master sheet carrying drum, means for driving the drum, a platen roller coactive with the drum for pressing a copy sheet to a master sheet carried by the drum, and means for feeding copy sheets to the coactive drum and platen roller and moistening said copy sheets including a pair of rolls normally coactive to feed copy sheets, means for momentarily shifting one of said rolls out of contact with the other during each revolution of the drum, means for driving both rolls of said pair continuously during rotation of the drum, and means for continuously applying moisture to the periphery of said shiftable roll during rotation of the drum.

35. In a duplicating machine of the character described, a copy sheet feeding and moistening device comprising a combined feeding and moisture applying roll having a smooth peripheral surface, a roll contacting said first-mentioned roll and having a helical groove in its periphery extending repeatedly around the roll and substantially from end to end of the roll, means for maintaining a supply of liquid ink solvent about the lower portion of the second-mentioned roll, a third roll having a helical groove in its periphery extending repeatedly around the roll and substantially from end to end of the roll, said third roll contacting only the second roll and being located wholly out of contact with the supply of liquid ink solvent, the direction of wind of the helical groove in the second roll being opposite to that in the third roll, and means for so driving said rolls that the second roll rotates in a direction opposite to that in which the other two rolls rotate, said rolls being so arranged that moisture lifted from the supply by the second roll is carried first to the bight of the second and third rolls.

36. In a duplicating machine of the character described, a copy sheet feeding and moistening device comprising two contactive rolls each having in its periphery a helical groove which winds therearound in a direction opposite to the helical groove in the other roll, a third roll contactive with one of said grooved rolls and having a smooth periphery, means for so rotating the rolls that one of the grooved rolls turns oppositely to the other two rolls, and means for supplying moisture to one of said grooved rolls from end to end of the latter roll at such a point that the freshly moistened surface of the latter roll must pass the bight of the two grooved rolls before reaching the smooth surfaced roll.

37. In a duplicating machine of the character described, means for holding a supply of ink solvent, a roll having a helically grooved and non-absorptive periphery and rotatably mounted to turn with the lower part of the roll in ink solvent in said solvent holding means, a second roll having a helically grooved and non-absorptive periphery located to turn in contact with the periphery of the first roll and wholly outside of the supply of ink solvent, the direction of wind of the helical grooves of the two rolls being different, means for so rotatively driving the rolls that each turns oppositely to the other, and a roll for taking solvent from said first roll for application to a copy sheet, said last-mentioned roll having a smooth non-absorptive periphery contactive with the periphery of the first-mentioned roll where the latter carries only such solvent as has passed from the supply through the bight of the two helically grooved rolls.

38. In a duplicating machine of the character described, copy sheet moistening means including two contactive and non-absorptive rolls each having a helical groove in its periphery, the direction of wind of the groove in one of said rolls being opposite to that of the groove in the other roll, means to drive said rolls, means for maintaining a supply of moisture to the periphery of one of said rolls, and a third non-absorptive roller having a smooth periphery and supported for transfer and moisture to its periphery by contact with one of said grooved rolls where the latter carries only such moisture as has passed through the bight of the grooved rolls.

39. In a duplicating machine of the class described, a copy sheet feeding and moistening device comprising a non-absorptive moisture applying and copy sheet feeding roller, a non-absorptive feed roller under said applying roller and coactive therewith to feed copy sheets, means for intermittently feeding copy sheets into the bight of said moisture applying roller and its coactive roller, means for lifting and lowering said moisture applying roller as the leading end of each copy sheet is fed toward said bight, said coactive rollers having smooth peripheries, a doctor roller contacting the lower one of said coactive rollers, means for driving said coactive rollers, and means for dampening the upper one of said coactive rollers.

40. A duplicating machine of the class described comprising a master sheet carrying drum rotatable about a horizontal axis, a platen roller under said drum and coactive therewith to press copy sheets to a drum-carried master sheet, a pair of superposed coactive non-absorptive copy sheet feed rollers located adjacent the bight of the drum and platen roller and extending parallel to said drum and platen roller, said feed rolls having smooth peripheries, an ink solvent tank forward of the upper one of said feed rollers, a solvent transfer roller contacting the upper one of said feed rollers and supported for turning with its lower portion in ink solvent in said tank, a control roller contacting the transfer roller, said transfer and control rollers being non-absorptive and each having in its periphery a helical groove, the grooves having opposite directions of wind, means for rotatively driving the drum and platen roller, means for rotatively driving said feed rollers and transfer and control rollers to feed copy sheets to the drum and platen roller during driving of the latter and to carry moisture from the tank past the bight of the grooved rollers to the upper feed roller for application to the upper faces of fed copy sheets.

41. A duplicating machine, as claimed in claim 40, having barometric feed means for maintaining a constant level of solvent in the tank, said means comprising a solvent reservoir shiftable to feed solvent into the tank and to drain solvent from the tank.

42. A duplicating machine, as claimed in claim 40, having means for intermittently feeding copy sheets under the tank to the feed rolls.

43. A duplicating machine of the character described having an ink solvent tank, means for feeding copy sheets and for transferring solvent from said tank to a copy sheet as the latter is being fed, and barometric solvent-feeding means for maintaining a constant level of solvent in the tank, said last-mentioned means including a horizontally extending combined supply and drain conduit for said tank rigidly affixed to said tank, and a solvent container supported from and pivotally shiftable about said conduit relatively to said tank from a position in which solvent will feed from said container through said conduit into the tank to a position in which solvent will drain through said conduit into the container from the tank.

44. A duplicating machine, as claimed in claim 43, wherein said container is detachable from said conduit for re-filling of the container.

45. A duplicating machine of the character described comprising a frame, a master sheet carrying drum journalled in the frame to rotate about a fixed horizontal axis extending transversely of the frame, a platen roller extending longitudinally of the drum under the drum, a pair of rock arms independently pivotally held to the frame to swing up and down about a horizontal axis extending transversely of the frame adjacent opposite sides of the frame, said platen roller being journalled at its ends in the free ends of said rock arms, a pair of bellcranks adjacent opposite sides of the machine and each having an inwardly extending arm engaged under the adjacent rock arm to support the latter and also having a pendant arm, said bellcranks being each pivoted for up and down movement of its inwardly extending arm and in and out movement of its pendant arm, and tie means connecting the pendant arms of the bellcranks to support the platen roller carrying rock arms, said tie means being adjustable to vary the height of the platen roller in the frame.

46. A duplicating machine, as claimed in claim 45, wherein said tie means comprises a bolt and nut tie device adjustable to shift the bellcranks to raise and lower the platen roller by screwing up and backing off a nut threaded on the bolt element of said tie device.

47. A duplicating machine of the class described comprising a master sheet carrying drum rotatable about a horizontal axis, a platen roller coactive with the drum to press copy sheets to a drum-carried master sheet, an ink solvent tank, a solvent transfer roller supported for rotation about an axis parallel with the axes of the drum and platen roller with the lower portion of said transfer roller dipping in solvent in said tank, a solvent supply control roller supported to turn in contact with the transfer roller about an axis parallel to that of the transfer roller, said transfer and control rollers having each a non-absorptive periphery in which is formed a helical groove winding about the roller substantially from end to end of the roller, and a pair of coactive copy sheet feed rollers having non-absorptive and smooth peripheries and supported to feed copy sheets to the coactive drum and platen roller with one of said feed rollers in contact with the periphery of said transfer roller.

48. In a duplicating machine of the class described, the combination of a rotatable master sheet carrier, a platen roller coactive with said carrier to press a copy sheet to a master sheet carried by the carrier, a copy sheet moistening roller and a feed roller coactive with said moistening roller to feed moistened copy sheets to the carrier and platen roller, introductory feed means for intermittently feeding copy sheets to the bight of the coactive moistening and feed rollers for moistening, means for separating the coactive moistening and feed rollers during each revolution of the master sheet carrier and restoring contact therebetween as a fed copy sheet approaches the bight of the moistening and feed rollers, and copy sheet controlled means for permitting restoration of said contact only when a copy sheet is advanced toward said bight by said introductory feed means.

49. In a duplicating machine of the class described having a master sheet carrying drum rotatable about a horizontal axis and a platen roll parallel to the drum and located under the drum for coaction with the latter to feed copy sheets between the drum and roller and press the sheets to a drum-carried master sheet, the combination of a pair of superposed coactive copy sheet feed rolls located adjacent the bight of said drum and platen roll and extending parallel to the drum and platen roll for feeding copy sheets into said bight, the uppermost one of said pair superposed feed rolls having a rigid and smooth non-absorptive peripheral surface, an ink solvent delivery roll parallel to the feed rolls and having a rigid non-absorptive peripheral surface contacting the said uppermost feed roll and formed with a shallow and narrow helical groove extending from end to end of its peripheral surface, means for driving said drum and rolls to feed copy sheets through the machine, means for maintaining ink solvent at a constant level about the lower portion of said solvent delivery roll, and a doctor roll parallel to the delivery roll and having a rigid non-absorptive peripheral surface and associated with the delivery roll above said solvent supply level to control the amount of solvent carried from the supply to said uppermost feed roll by the delivery roll.

50. In a duplicating machine of the class described having a horizontally disposed master sheet carrying drum and a parallel platen roll coactive to feed copy sheets therebetween, the combination with said drum and platen roll of a pair of opposed parallel copy sheet feed rolls coactive to feed copy sheets therebetween to the drum and platen roll, one of said pair of feed rolls having a rigid and smooth non-absorptive peripheral surface, an ink solvent delivery roll parallel to said last-mentioned feed roll and having a rigid non-absorptive peripheral surface contacting the periphery of said feed roll, said delivery roll formed with a helical groove in its periphery, means for maintaining a supply of ink solvent at a constant level about the lower portion of said delivery roll, means coactive with the delivery roll to control the amount of ink solvent delivered by the delivery roll to the feed roll contacted by the delivery roll, and means for driving said drum and rolls to feed, moisten and print copy sheets.

JOHN J. FLANIGAN.

CERTIFICATE OF CORRECTION.

Patent No. 2,185,188. January 2, 1940.

JOHN J. FLANIGAN.

It is hereby certified that error appears in the printed specification of the above numbered patent requiring correction as follows: Page 10, first column, line 22, claim 3, before the word "member" insert --said control--; page 14, second column, line 13, claim 38, for "and" before "moisture" read --of--; page 15, second column, line 27, claim 49, after "pair" insert --of--; and that the said Letters Patent should be read with this correction therein that the same may conform to the record of the case in the Patent Office.

Signed and sealed this 28th day of January, A. D. 1941.

(Seal)

Henry Van Arsdale,
Acting Commissioner of Patents.